United States Patent [19]

Suzuki et al.

[11] Patent Number: 5,533,121
[45] Date of Patent: Jul. 2, 1996

[54] ECHO CANCELLER AND METHOD FOR CONTROLLING ECHO CANCELLATION

[75] Inventors: Shigeaki Suzuki; Yushi Naito, both of Kanagawa, Japan

[73] Assignee: Mitsubishi Denki Kabushiki Kaisha, Tokyo, Japan

[21] Appl. No.: 301,344

[22] Filed: Sep. 6, 1994

[30] Foreign Application Priority Data

Sep. 7, 1993 [JP] Japan .................. 5-222496

[51] Int. Cl.⁶ .................................................. H04M 1/58
[52] U.S. Cl. ...................... 379/410; 379/406; 370/32.1
[58] Field of Search ..................... 379/410, 411, 379/406, 407; 370/32.1, 81, 110.1; 375/14

[56] References Cited

U.S. PATENT DOCUMENTS

| | | | |
|---|---|---|---|
| 4,528,676 | 7/1985 | Mein et al. | 375/14 |
| 4,747,096 | 5/1988 | Piasecki et al. | 370/81 |
| 4,881,221 | 11/1989 | Schroeder et al. | 370/22.1 |
| 4,945,533 | 7/1990 | Schroeder et al. | 370/32.1 |
| 5,014,307 | 5/1991 | Joffe et al. | 379/410 |
| 5,029,204 | 7/1991 | Shenoi et al. | 379/407 |
| 5,123,009 | 6/1992 | Winter | 370/32.1 |
| 5,420,921 | 5/1995 | Lahdemaki | 379/407 |

FOREIGN PATENT DOCUMENTS 4-165825  6/1992  Japan ..................... H04B 3/23

*Primary Examiner*—Jeffery Hofsass
*Assistant Examiner*—Scott Wolinsky
*Attorney, Agent, or Firm*—Wolf, Greenfield & Sacks

[57] ABSTRACT

An echo canceller is disclosed which is capable of disabling its echo cancelling function when other echo cancellers are connected in tandem in a communications network. A pattern is inserted by extracting bits from a receiving side pulse code modulation (PCM) signal bit stream and replacing them with a predetermined bit-pattern sequence. When the predetermined bit-pattern sequence is detected at a transmission side input PCM signal bit stream, the echo cancelling function is disabled.

44 Claims, 15 Drawing Sheets

5,533,121

ECHO CANCELLER AND METHOD FOR CONTROLLING ECHO CANCELLATION

BACKGROUND OF THE INVENTION

1. Field of the Invention

The invention relates to an echo canceller which cancels echo generated at 2-wire/4-wire conversion portion due to the impedance mismatching and a method for controlling the echo cancellation of the echo canceller.

2. Description of the Prior Art

Along with the increasing of communication demand in recent years, communications networks, which transmit integrated signals such as voice, images and data signals using digital multiplexers, are constructed everywhere in the world. For the high efficiency transmission of voice signals, it is usual to equip low-bit-rate CODECs with the digital multiplexers.

Furthermore, in case that the transmission delay becomes significant, because of the long transmission path such as international links or because of the processing delay introduced by the voice CODECs, echo cancellers shall also be equipped with the digital multiplexers.

FIG. 13 is an example of a telephone communication network which connects three points using digital multiplexers. In FIG. 10, elements 1, 2 and 3 are telephone terminals, elements 4, 5 and 6 are exchanges, elements 7, 8 and 9 are digital multiplexers, elements 10 and 11 are full duplex transmission links. When at telephone call from telephone terminal 1 to terminal 2, for example, is originated, only one transmission link and a pair of echo canceller, consequently, are involved within the end-to-end path. But when a telephone call from telephone terminal 1 to terminal 3, for example, is originated, two transmission links, 10 and 11, are connected in tandem by the exchange 5 to constitute an end-to-end transmission path, and two pairs of echo cancellers, consequently, are involved within the path as indicated in FIG. 14.

In such circuit configuration, it is desirable to disable the echo cancellers 13 and 14 which are put in the midst of the path. One reason is that the echo canceller which is put in the midst of the transmission path, echo canceller 13 for example, is not always capable to accommodate itself to the unknown transmission delay which exist across the exchange, where the total echo delay consists of the delays introduced by transmission links, link 11 for example, and the processing delays introduced by the CODECs, those implemented within multiplexers 8 and 9 for example. If the signal path across the exchange is composed of plural links, there is the possibility that the sum of the delays exceeds the adaptability of the echo canceller. Another reason is that the plural echo cancellers in the same path which serve for the same telephone terminal, echo canceller 13 and 15 for telephone terminal 1 for example, may disturb their echo cancelling operations to each other because each operation, which results in the modification of the transmission characteristics of the echo path, is performed independently. For those reasons, the echo path estimation of each echo canceller connected in tandem may be interfered and the overall transmission quality for the voice channel may be deteriorated.

In the past, for example, the laid-open Japanese patent publication No. 4-165825/92 discloses an echo canceller which disables echo cancelling function automatically when it is necessary. FIG. 15 shows a block diagram of the echo canceller in the above cited reference.

In FIG. 15, element 17 is an oscillator, element 22 is an echo canceller, elements 19 and 20 are channel associated signalling detectors, element 21 is a switching element which selects the output signal of echo canceller or output signal of oscillator for its output, element 18 is a micro processor which controls the operation of switching element 21 based on the information derived from channel associated signalling detectors 19 and 20, element 23 is a transmitting side input port, element 24 is a receiving side output port, element 25 is a transmission side output port and element 26 is a receiving side input port. The external circuit from element 24 to element 23 is usually called the tail circuit and another external circuit from element 25 to element 26 is usually called the long haul circuit. An echo canceller is designed to cancel the echo signal originated in the tail circuit.

The operation of echo canceller shown in FIG. 15 is as follows. The oscillator 17 generates the 2100 Hz tone signal which corresponds to the echo canceller disabling tone signal as specified in the ITU-T Recommendation G.165. The micro processor 18 senses the status change of channel associated signalling information using the channel associated signalling detectors 19 and 20, and recognizes whether the voice channel is in a busy state or in the idle state. The switch 21 operates under the control of the micro processor 18, normally selecting the input signal from the echo canceller 22 for its output. But for a pre-determined short period after the status change of signalling information from the idle state to the busy state, the switch 21 selects the 2100 Hz tone signal generated by the oscillator 17 for its output. On detecting the 2100 Hz disabling tone, the echo cancellers in the network with automatic disabling capability can disable the echo cancelling function. This invention was made to disable the echo cancelling function within the digital network when the terminal equipment with echo cancelling capability, such as speaker phone terminals or tele-conference terminals are connected to the digital network with echo cancelling capabilities within the network to eliminate the cross interference between the network echo cancelling functions and the echo cancelling function of external terminal equipment.

This invention is valid only when the disabling tone generation capability is implemented with the echo canceller of terminal equipment. If the echo cancellers of above stated invention are implemented within the transmission network, in digital multiplexers for example, there is no way for each echo canceller to recognize whether it is put at the either end of the transmission path, as echo cancellers 12 or 15 in FIG. 13, or put at the midst of the transmission path, as echo cancellers 13 and 14 in FIG. 13 for example. In such case as indicated in FIG. 13 for example, the echo cancelling function of echo cancellers 12 and 15 which have to cancel the echo signals, generated at 4-wire/2-wire conversion elements within the exchanges 4, 6 and also in telephone terminal 1 and 3, are also disabled at the same time and the network performance is deteriorated.

SUMMARY OF THE INVENTION

It is a primary object of the present invention to provide an echo canceller which can disable its echo cancelling function when it is put in the midst of the tandem connection of the transmission links, and the exchange in its tail circuit makes the connection to the tail circuit of another echo canceller, not to the telephone terminal.

Also it is another object of the present invention to provide an echo canceller which limits the degradation of signal-to-noise (S/N) ratio of associated voice channel to realize the above mentioned object and prevents an occurrence of deterioration of voice quality and voice band data errors.

It is further object of the present invention to provide an echo canceller which has a simplified construction in order to realize the object of the invention.

According to one aspect of the invention, the echo canceller which cancels echo generated at 2-wire/4-wire conversion portion due to the impedance mismatching includes: an echo canceller for cancelling echo signal; a bit-pattern inserting means for inserting a predetermined bit-pattern by extracting bits from the receiving side input pulse code modulation (PCM) bit stream; and a bit-pattern detecting means for detecting the predetermined bit-pattern by monitoring the transmitting side input PCM bit stream.

According to another aspect of the present invention, the echo canceller further includes: a first channel associated signalling detection means for determining whether the voice channel at the receiving side is in idle state; a second channel associated signalling detection means for determining whether the voice channel at the transmitting side is in idle state; and an operation controlling means for disabling echo cancelling function of the echo canceller, which initiates disabling on detecting the predetermined bit-pattern and terminates disabling on recognizing both the transmitting and receive side signalling status to be in idle state.

According to another aspect of the present invention, the echo canceller further includes: a first common channel signalling detection means for determining whether the voice channel at the receiving side is in idle state; a second common channel signalling detection means for determining whether the voice channel at the transmitting side is in idle state; and an operation controlling means for disabling echo cancelling function of the echo canceller which initiates disabling on detecting the predetermined bit-pattern and terminates disabling on recognizing both the transmitting and receive side signalling status to be in idle state.

According to another aspect of the present invention, an echo canceller which cancels echo generated at 2-wire/4-wire conversion portion due to the impedance mismatching, where neither channel associated signalling detection nor common channel signalling detection is executed within the echo canceller includes: an echo canceller for cancelling echo signal; a bit-pattern inserting means for inserting predetermined bit-pattern into the receiving voice channel PCM bit stream; a bit-pattern detecting means for detecting the predetermined bit-pattern by monitoring the transmitting side input PCM bit stream; a signalling status information input port for obtaining the signalling information whether the relevant channel is in idle state or in busy state; and an operation controlling means for disabling echo cancelling function of the echo canceller for the duration starting from the detection of predetermined bit-pattern by the bit-pattern detecting portion or while the modem signal is conveyed in the voice channel and also disable to the end of the call which is notified by the signalling status input, and also enables the pattern inserting portion to insert the predetermined bit-pattern into receiving side output PCM signal bit stream.

According to another aspect of the present invention, an echo canceller which cancels echo generated at 2-wire/4-wire conversion portion by impedance mismatching, where voice channel is not coded by low bit rate coding includes: an echo cancelling means for canceling echo signal; a pattern inserting means for inserting a predetermined bit-pattern sequence a first pattern detecting means for detecting a predetermined bit-pattern by monitoring transmitting side input PCM signal bit stream to disable the echo cancelling means; a second pattern detecting means for detecting predetermined bit-pattern sequence by monitoring receiving side input PCM signal bit stream to inhibit bit-pattern insertion at the pattern inserting means.

According to another aspect of the present invention, an echo canceller which cancels echo generated at 2-wire/4-wire conversion portion by impedance mismatching includes; an echo cancelling means for canceling echo signal; a pattern inserting means for inserting a predetermined bit-pattern into the receiving voice channel PCM signal bit stream except for the duration when a data call is applied to the relevant echo canceller, a pattern detecting means for detecting predetermined bit-pattern sequence to disable the echo cancelling function of echo cancelling means; a tone detecting means for detecting a modem answering tone by monitoring a transmitting side and a receiving side input PCM signals; a power detecting means for detecting the end of data call by monitoring the absence of signal powers for more than predetermined period both in transmitting side and in receiving side input PCM signals; and a register the output of which is set for the duration of the data call started by the modem answering tone detection signal of the tone detecting means and terminated by the output of the power detecting means which implies the end of the data call.

According to another aspect of the present invention, an echo canceller which cancels echo generated at 2-wire/4-wire conversion portion by impedance mismatching includes; an echo cancelling means for canceling echo signal; a first channel associated signalling detecting means for determining whether the voice channel at the receiving side is in idle state; a second channel associated signalling detecting means for determining whether the voice channel at the transmitting side is in idle state; a pattern inserting means for inserting a predetermined bit-pattern under the control of operation controlling means a pattern detecting means for detecting a predetermined bit-pattern by monitoring a transmitting side input PCM signal; a tone detecting means for detecting a modem answering tone by monitoring both transmitting side and receiving side input PCM signals; and an operation controlling means for disabling echo cancelling function of the echo cancelling means for the duration starting from the detection of predetermined bit-pattern in the transmitting side input PCM bit stream at the pattern detecting means or from the detection of modem answering tone by monitoring both transmitting side and receiving side input PCM signals at the tone detecting means, until the voice channel becomes idle again by detecting the voice channel status changes from busy state to idle state both in receiving side and transmitting side at the first and the second channel associated signalling detecting means, and for enabling the pattern inserting means for a predetermined duration when the voice channel status changes from idle state to busy state by detecting the signalling status both in receiving side and transmitting side become busy state at the first and the second channel associated signalling detecting means but disabled overridden by the detection of modem answering tone at the tone detecting means.

According to another aspect of the present invention, an echo canceller which cancels echo generated at 2-wire/4-wire conversion portion by impedance mismatching includes; an echo cancelling means for canceling echo signal; a first common channel signalling detecting means for determining whether the voice channel at the receiving side is in idle state; a second common channel signalling detecting means for determining whether the voice channel at the transmitting side is in idle state; a pattern inserting means for inserting a predetermined bit-pattern under the control of operation controlling means; a pattern detecting means for detecting a predetermined bit-pattern by monitoring a transmitting side input PCM signal; a tone detecting means for detecting a modem answering tone by monitoring both transmitting side and receiving side input PCM signals; and an operation controlling means for disabling echo cancelling function of the echo cancelling means for the duration starting from the detection of predetermined bit-pattern in the transmitting side input PCM bit stream at the pattern detecting means or from the detection of modem answering tone by monitoring both transmitting side and receiving side input PCM signals at the tone detecting means until the voice channel becomes idle again by detecting the voice channel status changes from busy state to idle state both in receiving side and transmitting side at the first and the second common channel signalling detecting means, and for enabling the pattern inserting means for a predetermined duration when the voice channel status changes from idle state to busy state by detecting the signalling status both in receiving side and transmitting side become busy state at the first and the second common channel signalling detecting means but disabled overridden by the detection of modem answering tone at the tone detecting means.

According to another aspect of the present invention, an echo canceller which cancels echo generated at 2-wire/4-wire conversion portion by impedance mismatching includes; an echo canceller circuit for canceling echo signal; a signalling status input port to obtain the channel status information whether the relevant voice channel is in idle state or in busy state; a pattern inserting means for inserting a predetermined bit-pattern under the control of operation controlling means; a pattern detecting means for detecting a predetermined bit-pattern by monitoring a transmitting side input PCM signal; a tone detecting means for detecting a modem answering tone by monitoring both transmitting side and receiving side input PCM signals; and an operation controlling means for disabling echo cancelling function of the echo cancelling means for the duration starting from the detection of predetermined bit-pattern in the transmitting side input PCM bit stream at the pattern detecting means or from the detection of modem answering tone by monitoring both transmitting side and receiving side input PCM signals at the tone detecting means until the signalling status input signal changes from busy state to idle state, and for enabling the pattern inserting means for a predetermined duration when the signalling status input signal changes from idle state to busy but disabled overridden by the detection of modem answering tone at the tone detecting means.

According to another aspect of the present invention, an echo canceller which cancels echo generated at 2-wire/4-wire conversion portion by impedance mismatching includes; an echo canceller which cancels echo generated at 2-wire/4-wire conversion portion by impedance mismatching comprising: an echo cancelling means for canceling echo signal which is disabled while the predetermined bit-pattern is detected by the pattern detecting means, or while the data call is applied to the voice channel by the output of the register; a first pattern detecting means for detecting a predetermined bit pattern by monitoring a transmitting side input PCM signal bit stream, and disabling the echo cancelling function of the echo cancelling means while the predetermined bit-pattern is detected; a second pattern detecting means for detecting a predetermined bit pattern by monitoring receiving side input PCM signal bit stream to disable the pattern inserting function of predetermined bit-pattern at pattern inserting means; a pattern inserting means for inserting a predetermined bit-pattern into the receiving voice channel PCM which is disabled while the pre-determined bit-pattern sequence is detected at the second pattern detecting means or while the data call is detected setting the output of the register; a tone detecting means for detecting a modem answering tone by monitoring both transmitting side and receiving side input PCM signals; a power detecting means for detecting the end of data call by monitoring the absence of signal powers for more than predetermined period both in transmitting side and in receiving side input PCM signals; and a register the output of which is set for the duration of the data call starting by the modem answering tone detection signal of the tone detecting means and terminated by the output of the power detecting means which implies the end of the data call.

According to another aspect of the present invention, an echo canceller which cancels echo generated at 2-wire/4-wire conversion portion by impedance mismatching includes; an echo canceller which cancels echo generated at 2-wire/4-wire conversion portion by impedance mismatching comprising: an echo cancelling means for cancelling echo signal which is disabled while the predetermined bit-pattern is detected by the pattern detecting means, or while the data call is applied to the voice channel by the output of the register; a first pattern detecting means for detecting a predetermined bit pattern by monitoring a transmitting side input PCM signal bit stream, and disabling the echo cancelling function of the echo cancelling means while the predetermined bit-pattern is detected; a second pattern detecting means for detecting a predetermined bit pattern by monitoring receiving side input PCM signal bit stream to disable the pattern inserting function of predetermined bit-pattern at pattern inserting means; a pattern inserting means for inserting a predetermined a bit pattern into the receiving voice channel PCM which is disabled while the pre-determined bit-pattern sequence is detected at the second pattern detecting means or while the data call is detected setting the output of the register; a modem signal detection input port which receives the detecting information of modem answering tone from external tone detecting apparatus; a power detecting means for detecting the end of data call by monitoring the absence of signal powers for more than predetermined period both in transmitting side and in receiving side input PCM signals; and a register the output of which is set for the duration of the data call starting by the modem answering tone detection signal from external tone detecting apparatus via modem signal detection input port.

According to another aspect of the present invention, an echo canceller which cancels echo generated at 2-wire/4-wire conversion portion by impedance mismatching includes; an echo cancelling means for canceling echo signal; a first common channel signalling detecting means for determining whether the voice channel at the receiving side is in idle state; a second common channel signalling detecting means for determining whether the voice channel at the transmitting side is in idle state; a pattern inserting means for inserting a predetermined bit-pattern under the control of operation controlling means a pattern detecting means for detecting a predetermined bit-pattern by monitoring a transmitting side input PCM signal; a tone detecting means for detecting a modem answering tone by monitoring both transmitting side and receiving side input PCM signals; and an operation controlling means for disabling echo cancelling function of the echo cancelling means for the duration starting from the detection of predetermined bit-pattern in the transmitting side input PCM bit stream at the pattern detecting means or from the detection of modem answering tone by monitoring both transmitting side and receiving side input PCM signals at the tone detecting means until the voice channel becomes idle again by detecting the voice channel status changes from busy state to idle state both in receiving side and transmitting side at the first and the second common channel signalling detecting means, and for enabling the pattern inserting means for a predetermined duration when the voice channel status changes from idle state to busy state by detecting the signalling status both in receiving side and transmitting side become busy state at the first and the second common channel signalling detecting means but disabled overridden by the detection of modem answering tone at the tone detecting means.

According to another aspect of the present invention, an echo canceller includes: a pattern inserting means, which are arranged between exchanges of a channel associated signalling system, periodically extract second bits from LSBs of the receiving side PCM signal code-words and inserting a predetermined bit-pattern into the receiving side PCM signal code-words.

According to another aspect of the present invention, an echo canceller includes: a pattern inserting means, which are arranged between exchanges of a channel associated signalling system, extracts LSBs of the receiving side PCM signal code-words with the period of a number which has a prime number relation with a period of the PCM robbed-bit signalling system and insert a predetermined bit-pattern sequence into the receiving side PCM signal code-words, the pattern detecting means detects a predetermined bit-pattern sequence by permitting the corruption of the bit-pattern sequence to some predetermined extent in pattern matching process in pattern detection.

According to another aspect of the present invention, a method for controlling echo cancellation in an echo canceller which cancels echo generated at 2-wire/4-wire conversion portion by impedance mismatching, said method includes the steps of: inserting a pattern in a receiving PCM signal; and disabling said echo cancellation when the pattern is detected in a transmitting side input PCM signal. According another aspect of the present invention, an echo canceller which cancels echo generated at 2-wire/4-wire conversion portion by impedance mismatching includes: an echo cancelling means for cancelling echo signal; a pattern insertion means for inserting a pattern in a receiving side PCM signal; and operation control means for disabling said echo cancelling means for disabling said echo cancelling means when the pattern is detected in a transmitting side input PCM signal pattern insertion means for inserting a pattern in receiving side PCM signal.

DETAILED DESCRIPTION OF THE PREFERRED EMBODIMENTS

Embodiment 1

The first embodiment of the present invention is explained below.

Figure 1:
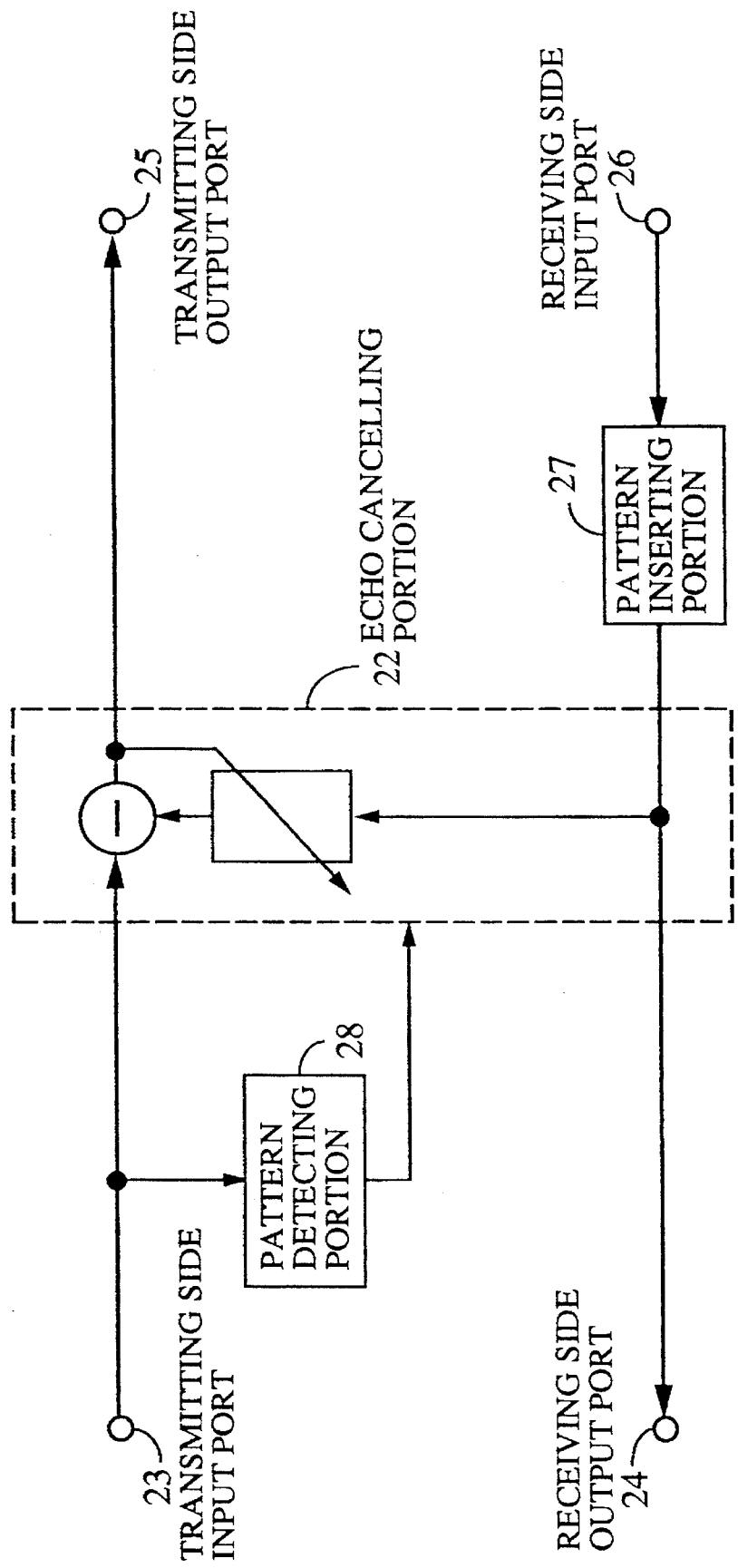
FIG. 1 shows a block diagram of a first embodiment of the present invention.

FIG. 1 is a block diagram of a first embodiment of an echo canceller. In FIG. 1, element 22 is an echo cancelling portion similar to that in the prior art, element 27 is a pattern inserting portion which receives PCM signal from receiving side input port and inserts predetermined bit-pattern sequence periodically into the receiving side PCM signal output bit stream to the tail circuit, and element 28 is a pattern detecting portion which monitors PCM signal at the transmitting side input port and detects predetermined bit-pattern sequence which is inserted periodically at the preceding pattern inserting portion of another echo canceller located in the opposite side of the digital exchange in tandem connection.

An operation of the echo canceller shown in FIG. 1 is explained below. The pattern inserting portion 27 periodically extracts a predetermined bits, for example, the least significant bits (LSBs) of the PCM code-words, from PCM bit stream at receiving side input port and inserts a predetermined bit-pattern sequence periodically instead of extracted bits. Although the S/N ratio of the PCM signal from the receiving side input port deteriorates by this signal processing, it is possible for the speech transmission quality to be scarcely influenced by extending the interval between bit extraction and thus reducing the degradation of the S/N ratio of the voice channel.

The pattern detecting portion 28 monitors PCM signal from transmitting side input port, and outputs a first signal to the cancelling portion 22 if the predetermined bit-pattern sequence is detected, and outputs a second signal if the predetermined bit-pattern sequence is not detected. The echo cancelling portion 22 operates normally when the first signal from pattern detecting portion 28 is received and disables the echo cancelling function when the second signal from the pattern detecting portion 28 is received.

As described before, FIG. 13 shows an example of telephone communications network which connects three points using digital multiplexers and exchanges.

Figure 14:
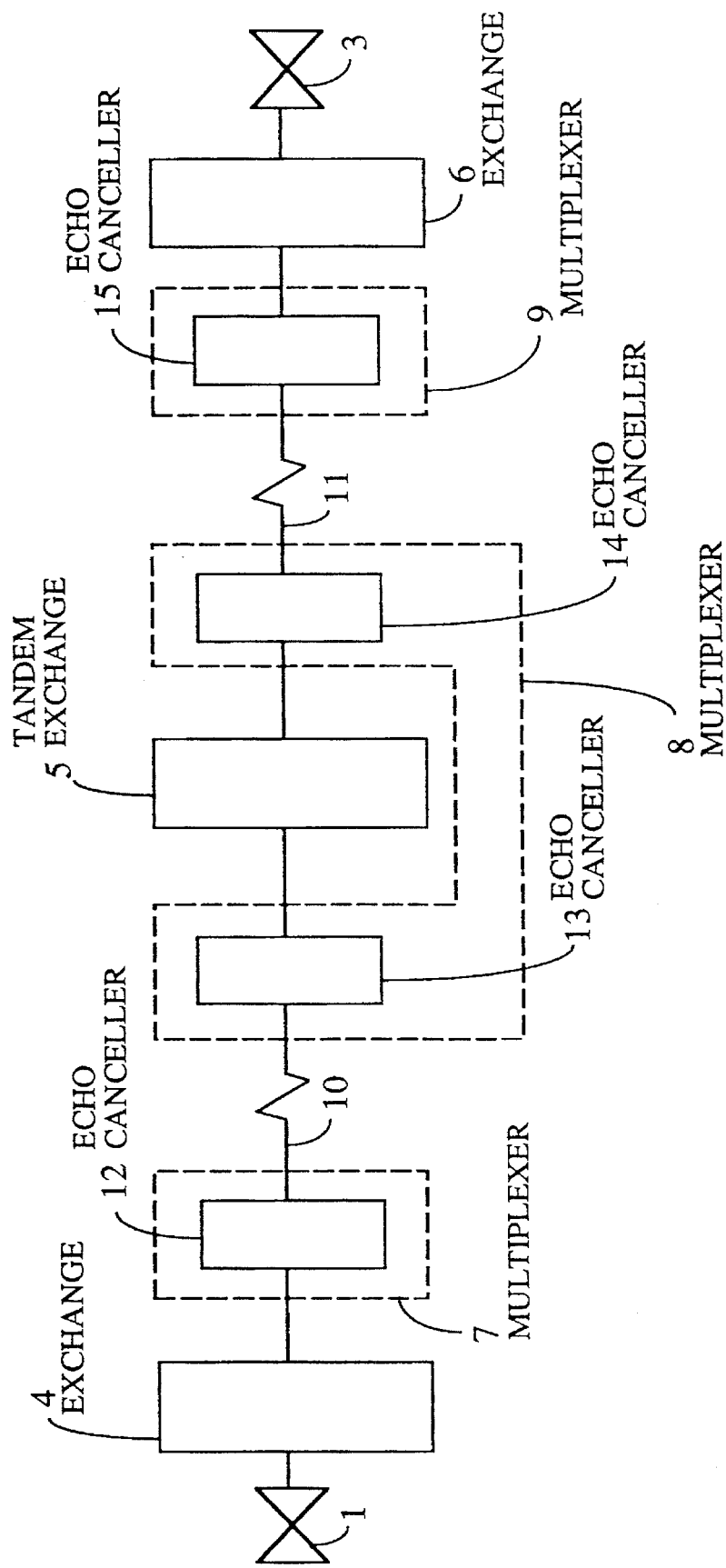
FIG. 14 shows an example of a conventional telephone communications network which is in the configuration of tandem connection.
Figure 15:
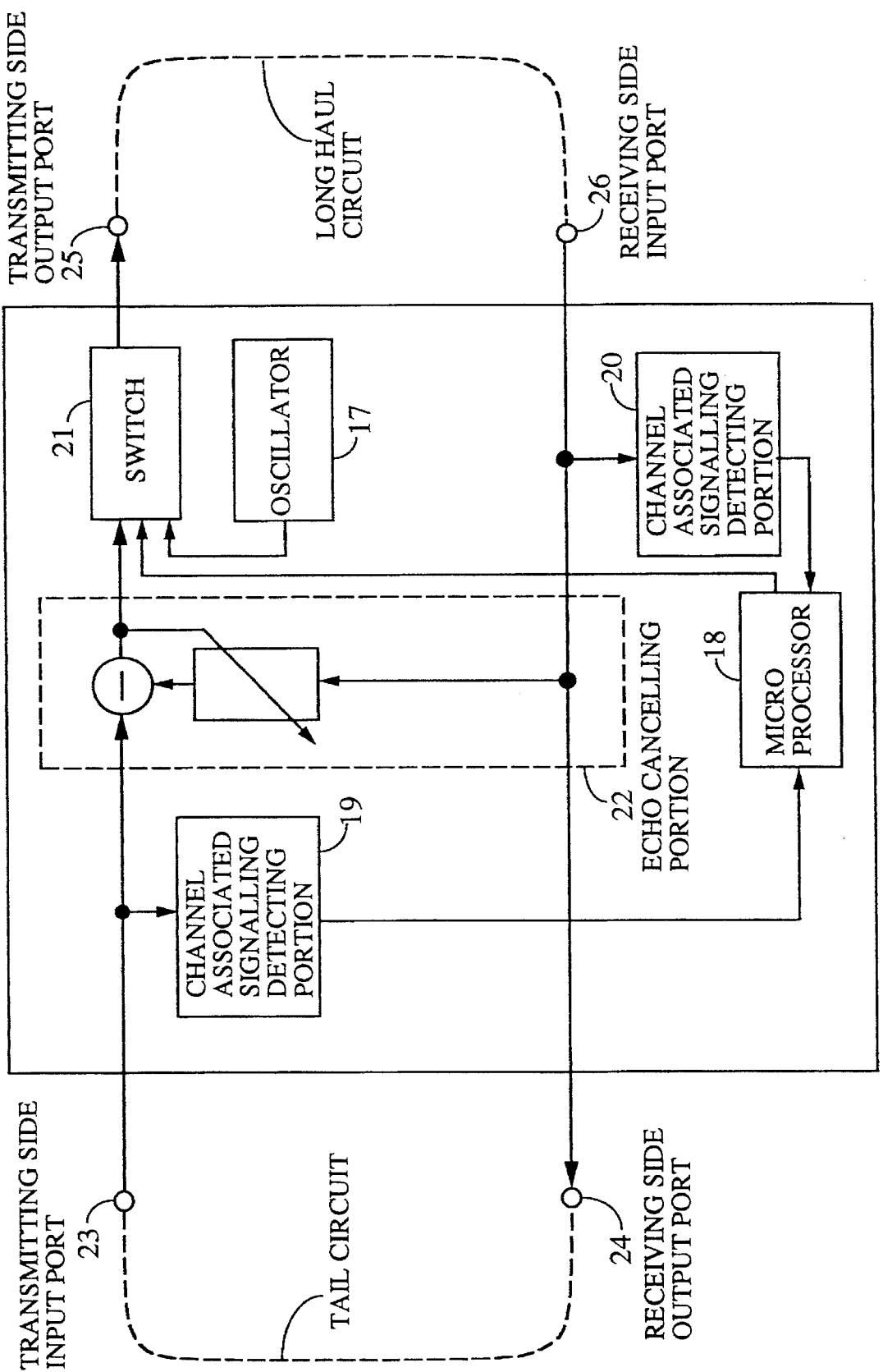
FIG. 15 shows a block diagram of a conventional echo cancelling apparatus.

FIG. 14 shows an example of tandem link connection where two telephone signal transmission links between the digital multiplexers are connected in tandem by the exchange to compose the overall transmission path. Operations of the respective echo cancellers 12, 13, 14 and 15 in FIG. 14 are explained below when the echo canceller shown in FIG. 1 is used in place of the prior art echo cancellers in FIG. 15.

First, the echo canceller 12 operates so as to cancel the echo signals generated in telephone terminal 1 and in exchange 4 since the predetermined bit-pattern sequence is not detected by the pattern detecting portion 28, because the PCM signal from transmitting side input port is an PCM encoded voice signal outputted from the telephone terminal 1 through the exchange 4. That is, when the voice signal with echo component is sampled and encoded, the PCM signal has no specific periodical bit-pattern sequence therein. The echo canceller 15 operates in the same way since it is connected at a symmetric location.

Second, at the pattern inserting portion 27 (FIG. 1) of the echo canceller 13, a predetermined bit-pattern sequence is inserted into the receiving side PCM signal output and transmitted to the exchange 5 through the receiving side output port 24 (FIG. 1). This signal is inputted into the echo canceller 14 via exchange 6. Accordingly, the bit-pattern detecting portion 28 (FIG. 1) in the echo canceller 14 detects the predetermined bit-pattern sequence in the input PCM bit stream from transmitting side input port 23 (FIG. 1) and disables the echo cancelling function of the echo cancelling portion 22 (FIG. 1).

In the same way, the pattern detecting portion 28 of echo canceller 13 detects the predetermined bit-pattern sequence which is inserted at the pattern inserting portion 27 of echo canceller 14 and disables the echo cancelling function of the echo cancelling portion 22 in the echo canceller 13.

As described above, each echo canceller connected to the exchange which makes the tandem connection of transmission links detects the predetermined bit-pattern sequence which is inserted at the pattern inserting portion of the opposite side echo canceller connected via exchange, and disables its echo cancelling function automatically.

Embodiment 2

Figure 2:
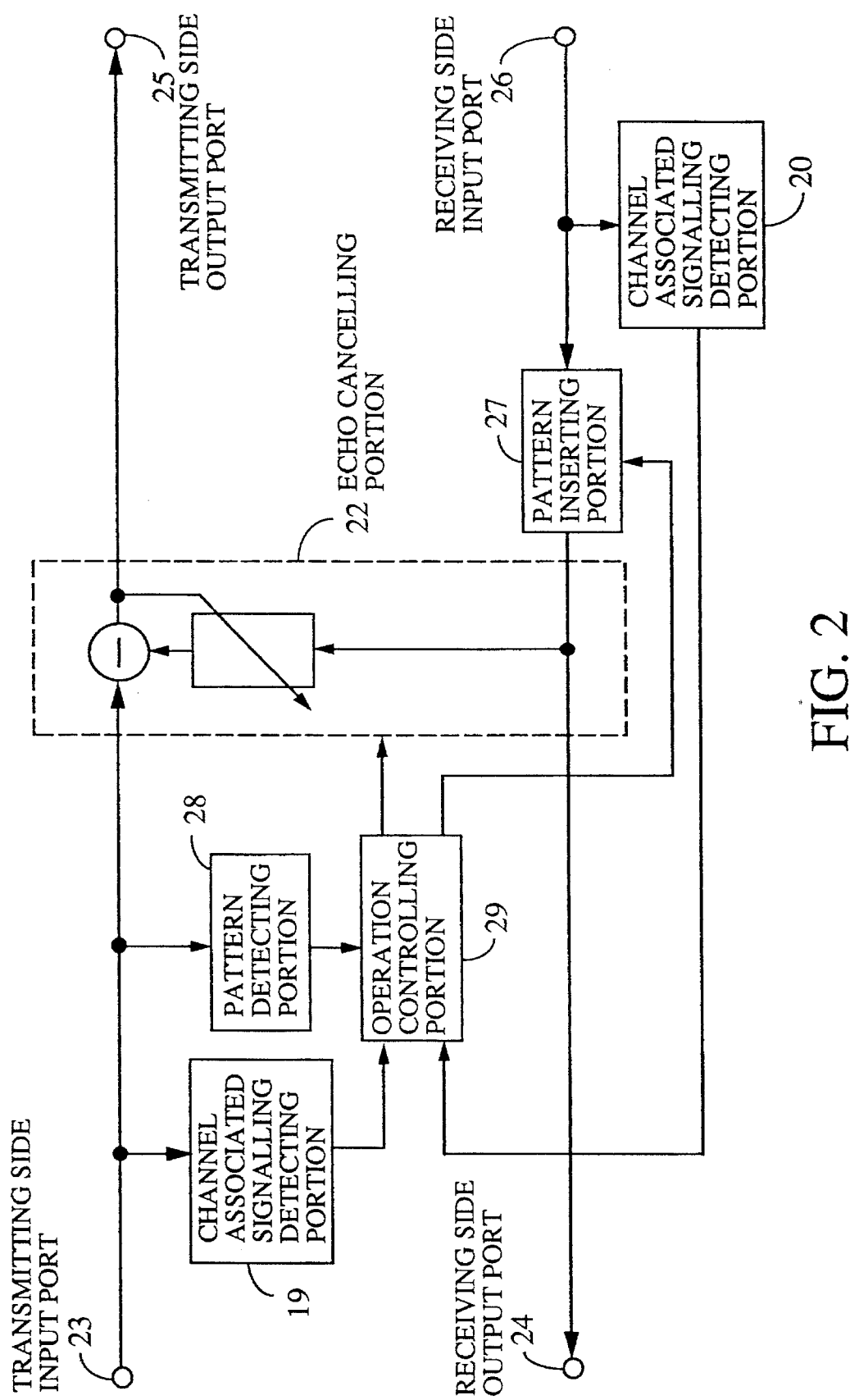
FIG. 2 shows a block diagram of a second embodiment of the present invention.

The second embodiment of the present invention is explained below. FIG. 2 shows a block diagram of the second embodiment of an echo canceller of the present invention.

In the first embodiment, the echo cancellers, which are connected to exchanges that make tandem connections, automatically disable their echo cancelling function. However as explained above, the S/N ratio of PCM signals slightly decreases and the speech communication quality slightly deteriorates. The echo canceller shown in FIG. 2 avoids the above mentioned degradation of S/N ratio and deterioration of speech quality.

In FIG. 2, elements 19 and 20 are channel associated signalling detecting portions which detect whether the associated voice channel is in the idle state element 29 is an operation controlling portion which can control the insertion of predetermined bit-pattern sequence and also can disable the echo cancelling function of the echo canceller.

The operation controlling portion 29 operates as follows. The operation controlling portion 29 receives the signals from the channel associated signalling detecting portions 19 and 20, and recognizes whether the voice channel status is idle or busy. If the channel status transition from idle state to busy state occurs, the predetermined bit-pattern sequence is inserted into receiving side PCM bit stream at the pattern inserting portion 27 for a predetermined duration under the control of operation controlling portion 29. Then, if the predetermined bit-pattern sequence in the input PCM bit stream from transmitting side input port is detected at the pattern detecting portion 28, the operation controlling portion 29 disables the echo cancelling function of the echo cancelling portion 22 until the channel status becomes idle again. The operation of other portions in FIG. 2 is similar to those in FIG. 1 already explained above.

The operation of operation controlling portion 29 is as follows.

The operation controlling portion 29 receives detected channel signalling status information from respective channel associated signalling detecting portions 19, 20 and determines whether the voice channel is in an idle state or not. The operation controlling portion 29 is outputs "1" to the pattern inserting portion 27 for a predetermined duration when the channel signalling status is changed from an idle state to busy state, and outputs "0" for the remaining duration. The pattern inserting portion 27 inserts a bit-pattern sequence only when the input signal from the operation controlling portion 29 outputs indicates "1". The operation controlling portion 29 also starts to output "1" to the cancelling portion 22 when the detection signal inputted from the pattern detecting portion 28 changes signal from "0" to "1", maintains its "1" state output while the channel is in the busy state and changes its output signal from "0" to "1" when the channel status becomes idle again..

As described above, the bit-pattern sequence insertion is carried out only for a predetermined duration after the establishment of telephone circuit connection. If the pattern detecting portion 28 detects the predetermined bit-pattern sequence while the bit-pattern sequence is inserted, the echo cancelling function is disabled until the end of the call when the channel status returns from busy state to the idle state again. Thereby, the deterioration of speech communication quality can be prevented for the most part of the call.

Embodiment 3

Figure 3:
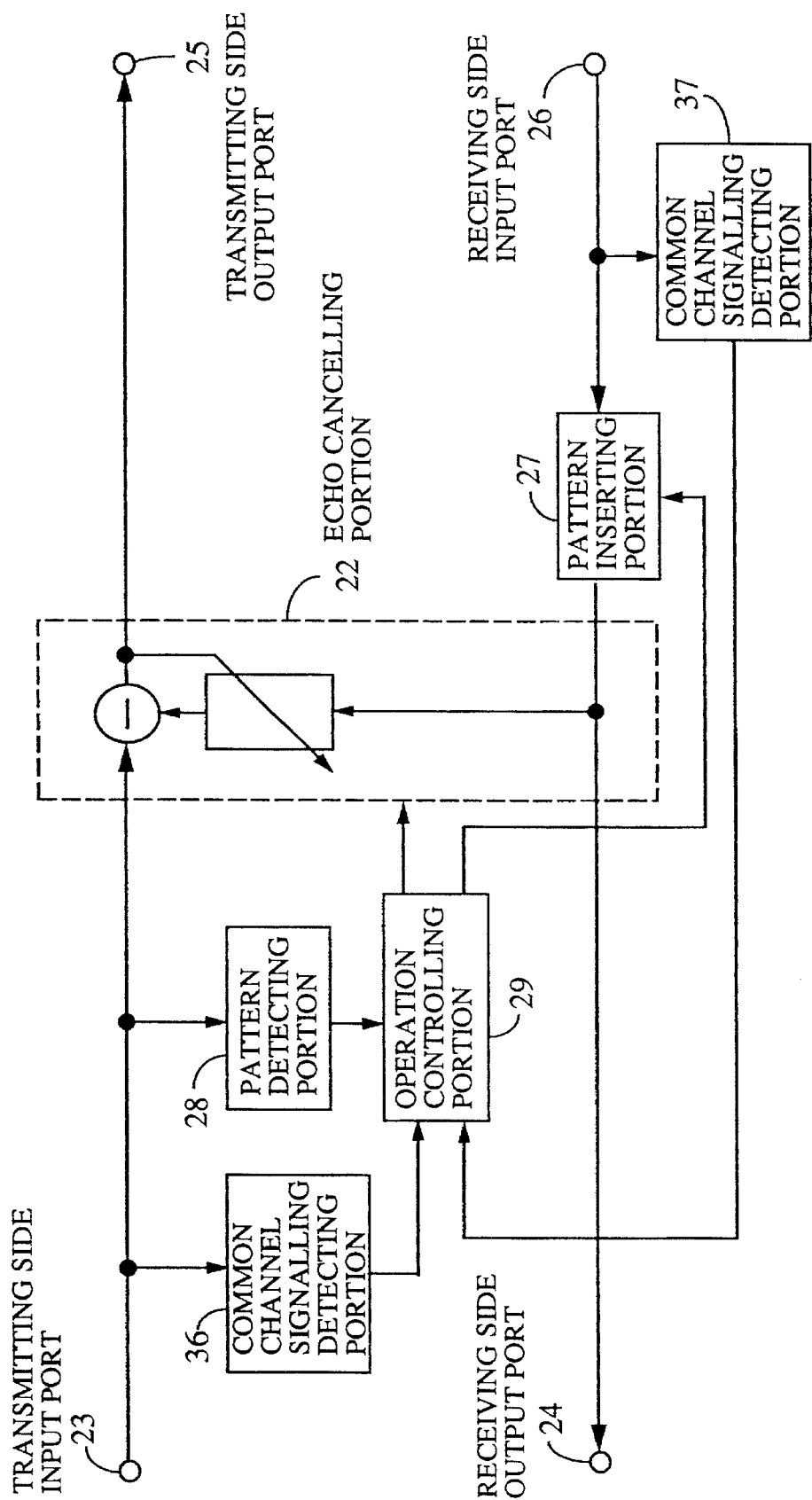
FIG. 3 shows a block diagram of a third embodiment of the present invention.

The third embodiment of the present invention is explained below. FIG. 3 is a block diagram of the third embodiment of an echo canceller of the present invention.

In the second embodiment in FIG. 2, the echo canceller is applied to the telephone network using the channel associated signalling system. The echo canceller of third embodiment illustrated in FIG. 3 is applied to the telephone network using common channel signalling system.

In FIG. 3, the channel associated signalling detecting portions 19 and 20 of FIG. 2 are substituted with the common channel signalling detecting portions 36 and 37. The operation of the third embodiment is similar to that of the second embodiment only with the difference that the signalling information is derived from the common signalling channel instead of channel associated signalling channels.

Embodiment 4

Figure 4:
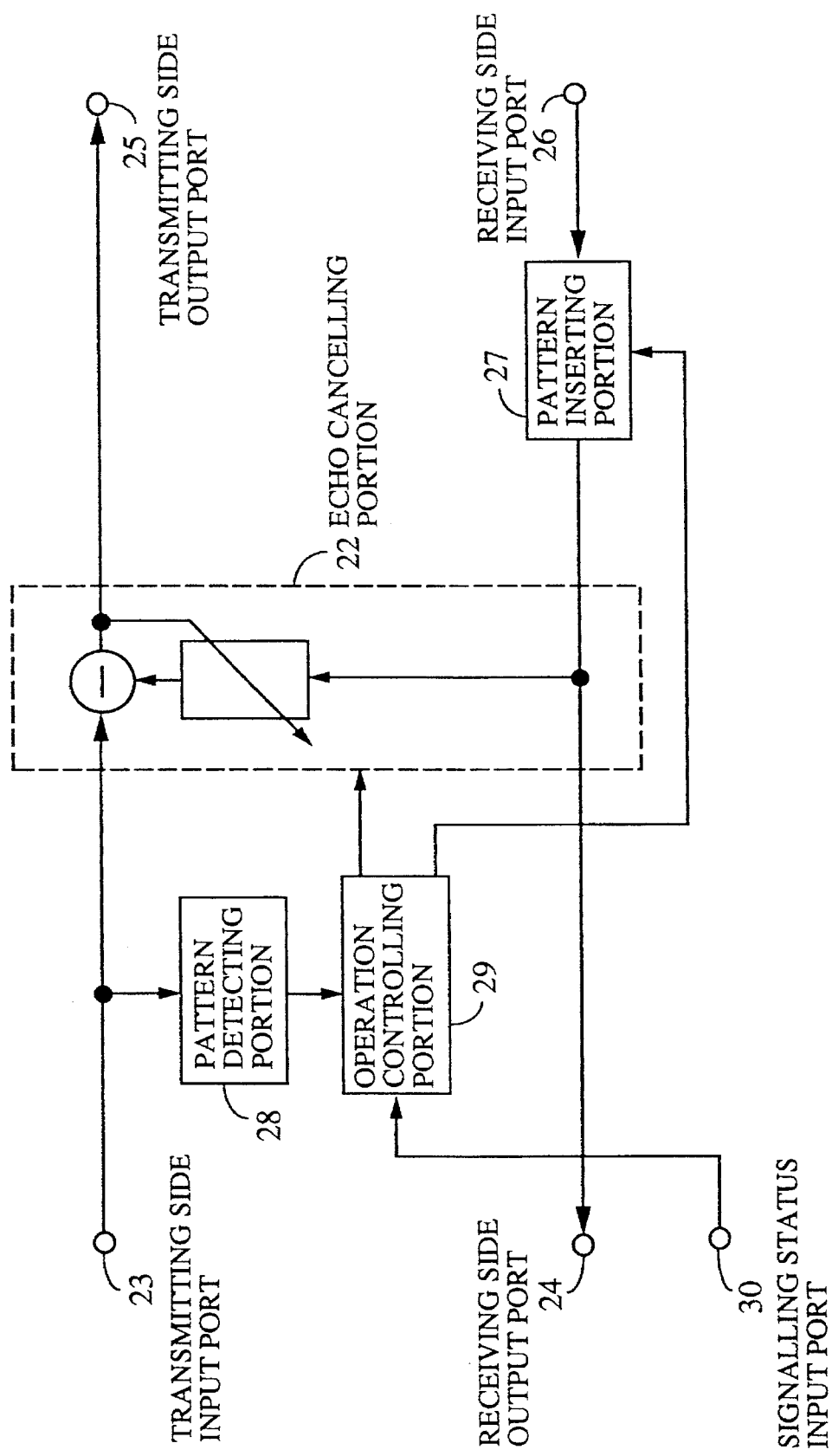
FIG. 4 shows a block diagram of a fourth embodiment of the present invention.

The fourth embodiment of the present invention is explained below FIG. 4 shows the block diagram of the fourth embodiment of an echo canceller of the present invention.

In the figure, element 30 is a signalling status input port which receives the signalling status information associated with the telephone channel on which the echo canceller is applied from the signalling detecting apparatus outside the echo canceller, for example, from the signalling detecting unit equipped within the digital multiplexed, as to whether the telephone channel is in idle state or not.

The operation of the fourth embodiment is similar to that of the second and the third embodiments only with the exception of signalling detecting portions being equipped outside the echo canceller.

In the fourth embodiment, when a channel associated signalling information or a common channel signalling information of the relevant telephone channel is detected in the digital multiplexer, for example, the information is supplied from the multiplexer via signalling status input port 30.

Specific operation of the fourth embodiment is explained below. When a channel associated signalling detecting unit or common channel signalling detecting unit is equipped within the digital multiplexer, the signalling information of the relevant channel derived from channel associated signalling channel or common signalling channel can be obtained from the digital multiplexer as described above. Therefore, the channel associated signalling detecting portions 19, 20 or the common channel signalling detecting portions 36, 37 are not needed in the echo canceller. In the case described above, the channel associated signalling information or the common channel signalling information of the relevant channel which notifies the channel status whether the telephone channel is in busy state or in idle state is obtained from the input signal of the signalling status input port 30. Then, the echo canceller is controlled based on the above mentioned channel status information.

As described above, in the fourth embodiment, the echo canceller does not need to equip the channel associated signalling detecting portions 19, 20 or common channel signalling detecting portions 36, 37, the construction of the echo canceller can be simplified.

Embodiment 5

Figure 5:
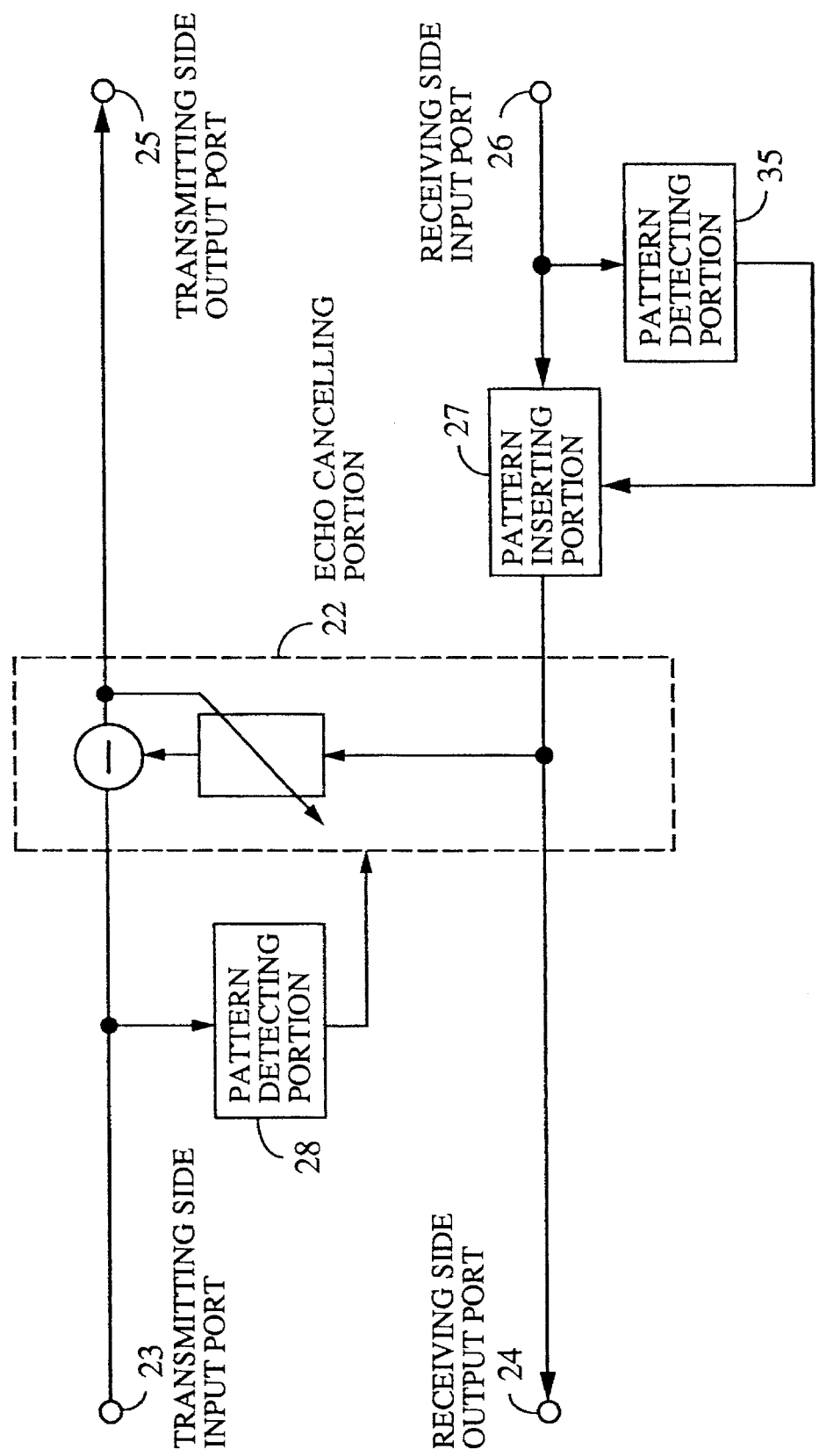
FIG. 5 shows a block diagram of a fifth embodiment of the present invention.

The fifth embodiment of the present invention is explained below. FIG. 5 shows a block diagram of the fifth embodiment of an echo canceller of the present invention.

In the fifth embodiment, an additional pattern detecting portion which is connected to receiving side input port is combined with the blocks shown in FIG. 1.

In FIG. 5, element 35 is an additional pattern detecting portion which monitors the receiving side PCM signal bit stream and detects the predetermined bit-pattern sequence. The pattern detecting portion 35 outputs from "1" to the pattern inserting portion 27 when the predetermined bit-pattern sequence is detected in the receiving PCM signal bit stream, and outputs from "0" when the predetermined bit-pattern sequence is not detected in the receiving PCM signal bit stream.

The pattern inserting portion 27 usually inserts a predetermined bit-pattern sequence while "0" is inputted as the control signal from the pattern detecting portion 35. On the other hand, the pattern inserting portion 27 stops inserting the bit-pattern sequence into the receiving PCM signal bit stream and pass through it to the receiving side output port 24 from "1" is inputted as the control signal from the pattern detecting portion 35. The operation of the fifth embodiment is similar to that of the first embodiment.

Specific operation of the fifth embodiment is explained below. The bit-pattern sequence is inserted into the receiving side PCM signal bit stream at the pattern inserting portion of every echo canceller in case from the first embodiment to the fourth embodiment. Therefore the bit-pattern sequence is inserted twice at the echo cancellers 13 and 15 as shown in FIG. 14 if the voice signal is transmitted from telephone terminal 1 to the telephone terminal 3, for example, in case the tandem connection is made.

It is well known that if the voice signal is encoded by the low-bit-rate voice CODECs, the PCM code-words before low-bit-rate encoding are not always transparently decoded at the decoder, and the predetermined bit-pattern sequence which was embedded in the PCM bit stream before low-bit-rate coding may be eliminated from the decoded PCM bit stream. Alternatively, in case that the low- bit-rate voice CODECs are not used for transmission, the bit-pattern sequence which was embedded in the PCM bit stream before transmission is preserved unchanged after transmission.

Figure 13:
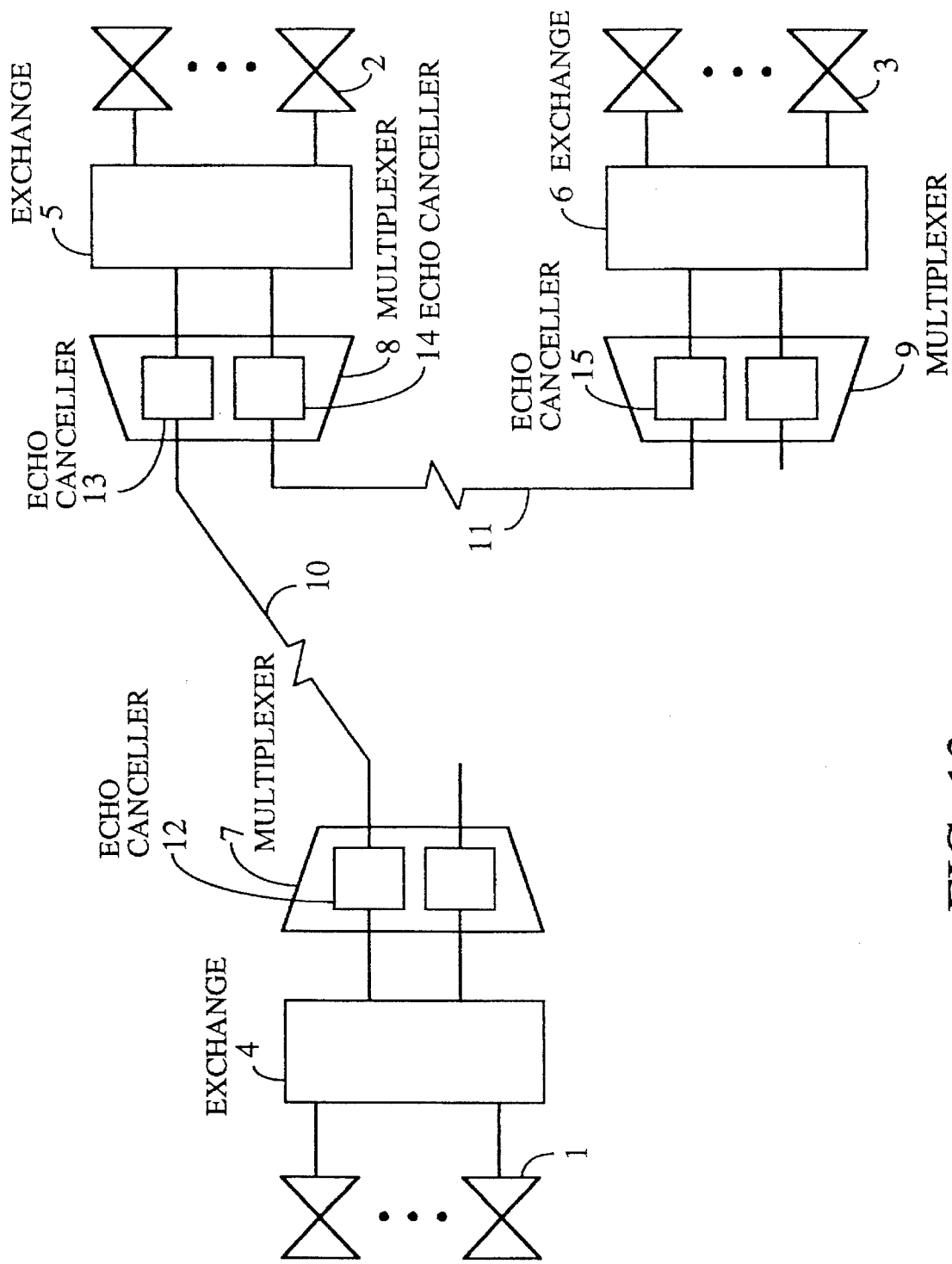
FIG. 13 shows an example of a telephone communications network in which three points are connected using digital multiplexing apparatus

Therefore, in case the voice signal is transmitted as PCM signal via the transmission link 10 and 11 and the low-bit-rate voice CODECs are not equipped in the digital multiplexers in the telephone network shown in FIG. 13, the pattern detecting portion 35 controls the pattern inserting portion 27 to stop inserting the predetermined bit-pattern sequence into the incoming receive side input PCM signal bit stream and passes it through as the receiving side output PCM signal bit stream if the predetermined bit-pattern sequence is detected by the pattern detecting portion 35. Thus, the bit-pattern insertion is limited only once throughout the path from telephone terminal 1 to telephone terminal 2 and vice versa which minimizes the degradation of S/N ratio of the voice channel in each direction.

The bit-pattern sequence insertion mechanism is explained below when the echo canceller shown in FIG. 5 is applied to the echo cancellers 12, 13, 14 and 15 in FIG. 14 along with the voice signal transmission from telephone terminal 1 to telephone terminal 2.

First the voice signal outputted from the telephone terminal 1 gets to the echo canceller 12 via digital exchange 4, then to the echo canceller 13 through the transmission link 10. In this case, the predetermined bit-pattern sequence is inserted at the echo canceller 13 for the first time since the bit-pattern sequence is not detected by the pattern detecting portion 35 of the echo canceller 13. Then the PCM voice signal with predetermined bit-pattern sequence embedded in its bit stream gets to the echo canceller 14 via digital exchange 6. Since the predetermined bit-pattern sequence is detected by the pattern detecting portion 28 of the echo canceller 14, the echo canceller 14 disables its echo cancelling function automatically.

Accordingly, the transmitting side input PCM signal bit stream is outputted to the transmission link 11 without carrying out the echo cancelling operation at the echo canceller 14. Therefore, the pattern detecting portion 35 in the echo canceller 15 detects the predetermined bit-pattern sequence which has been inserted by the pattern inserting portion 27 of echo canceller 13.

So, the echo canceller 15 stops inserting the predetermined bit-pattern sequence at the pattern inserting portion 27 into the receiving side output PCM signal bit stream, thus the number of predetermined bit-pattern insertion executed in one way transmission path from telephone terminal 1 to telephone terminal 2 is restricted to once without introducing unnecessary degradation of the voice channel quality.

Embodiment 6

Figure 6:
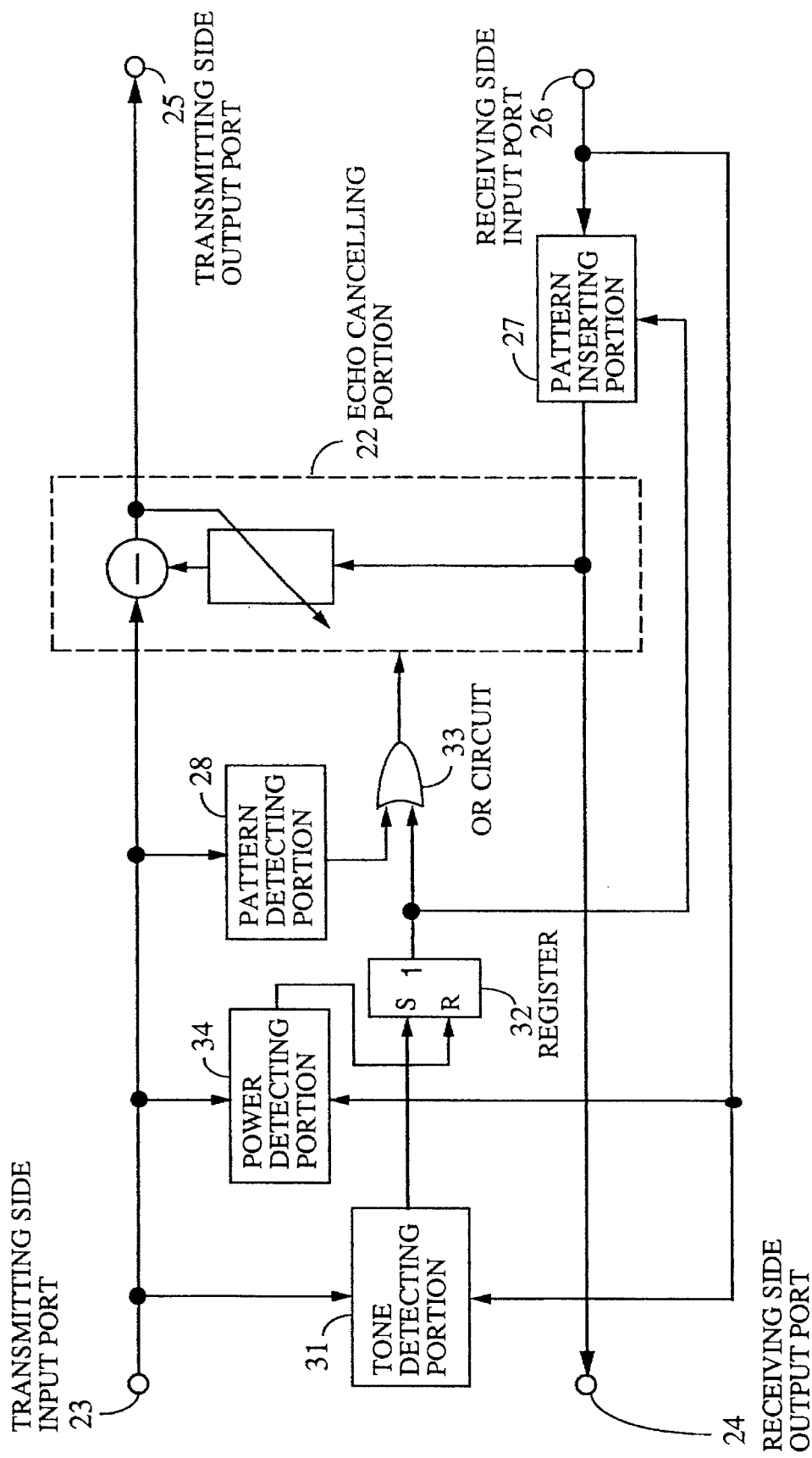
FIG. 6 shows a block diagram of a sixth embodiment of the present invention.

The sixth embodiment of the present invention is explained below. FIG. 6 shows a block diagram of the sixth embodiment of an echo canceller of the present invention.

In the sixth embodiment, a tone detecting portion which detects a tone signal of 2100 Hz being equivalent to the modem answering tone, a power detecting portion which detects the continuity of the data call using voice-band modems, a register and an OR circuit are combined with the blocks shown in FIG. 1.

In FIG. 6, element 31 is a tone detecting portion, element 32 is a register, element 33 is an OR circuit and element 34 is a power detecting portion. The operation of the sixth embodiment is similar to that of the first embodiment.

Specific operation of the sixth embodiment is explained below. The tone detecting portion 31 monitors both the transmitting side input signal and receiving side input signal, and on detecting the modem answering tone signal of 2100 Hz in either side, it outputs "1" to the register 32 to set its output to "1". The power detecting portion 34 also monitors both the transmitting side input signal and receiving side input signal to detect the end of data call by confirming the absence of voice channel signal power in any direction for more than a pre-determined duration and generates the output signal "1" to reset the output of register 32 to "0". Thus the output of the register 32 becomes "1" for the duration of data call. The OR circuit 33 outputs "1" to the echo cancelling portion 22 in order to disable the echo cancelling function when either output signal from the pattern detecting portion 28 or from the register 32 is "1".

When a normal voice signal is applied to the echo canceller of sixth embodiment, the echo canceller and relevant functional portions act as the same as those of the first embodiment.

When a data call is applied to the echo canceller of the sixth embodiment, becomes the output of the register 32 is applied to the pattern inserting portion 27 to stop inserting the predetermined bit-pattern sequence into the receiving side output signal stream and also applied to the echo cancelling portion 22 via OR circuit 33 to disable its echo cancelling function.

Thus, if the normal voice signal is applied to the echo canceller of the sixth embodiment, the same automatic disabling capability of the echo cancelling function when it is connected in tandem with other echo cancellers as that of the echo canceller of the first embodiment can be obtained, and if the data call signal is applied to the echo canceller the voice-band modem signal can be transferred transparently through the echo canceller without suffering any degradation in both directions and the data error can be prevented.

Embodiment 7

Figure 7:
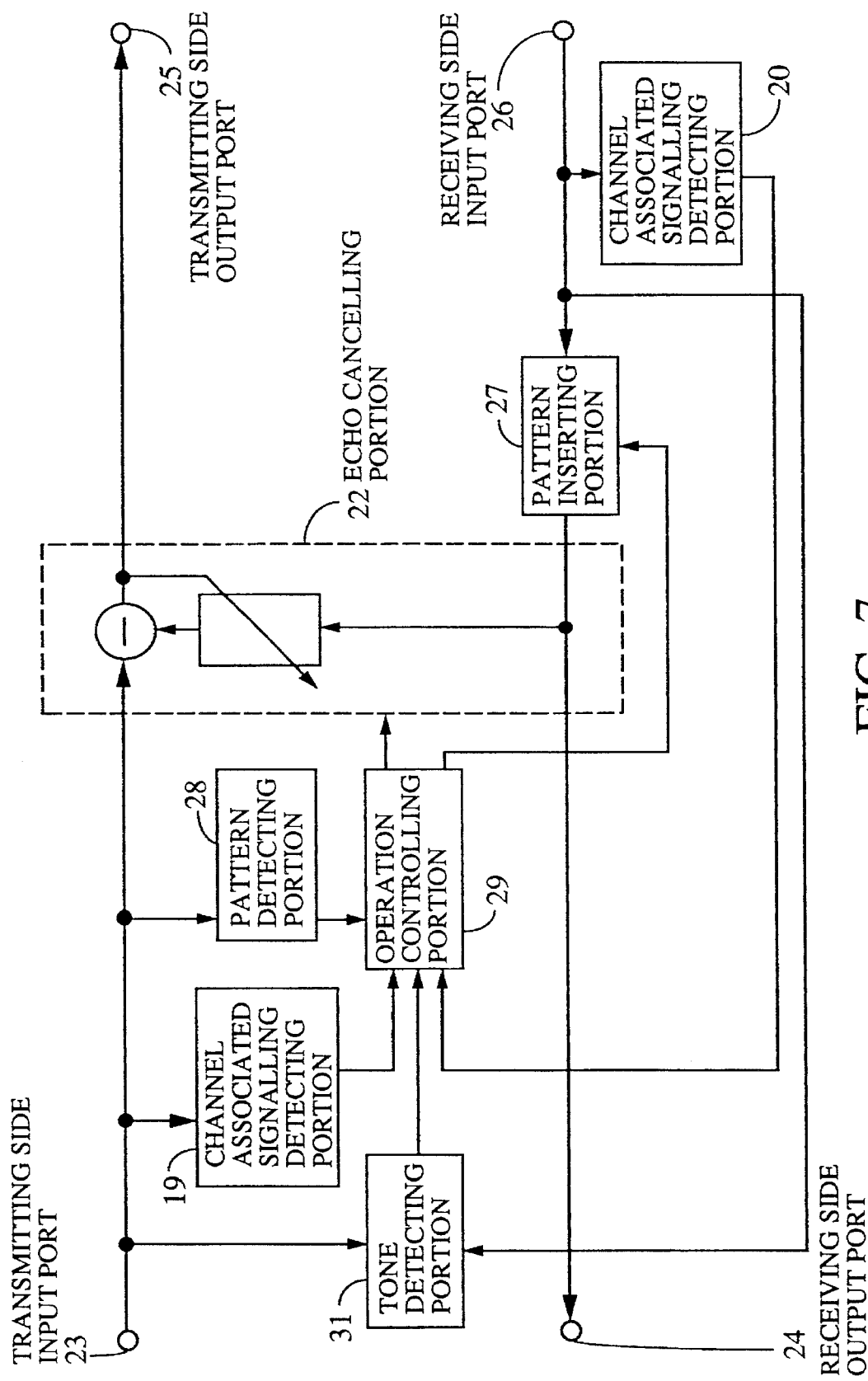
FIG. 7 shows a block diagram of a seventh embodiment of the present invention.

The seventh embodiment of the present invention is explained below. FIG. 7 shows the block diagram of the seventh embodiment of an echo canceller of the present invention.

In the seventh embodiment, a tone detecting portion 31 as explained before is combined with the blocks shown in FIG. 2.

In FIG. 7, element 31 is a tone detecting portion which monitors both the transmitting side input signal and receiving side input signal, and on detecting the modem answering tone signal of 2100 Hz, it outputs "1" to the operation controlling portion 29.

When a normal voice signal is applied to the echo canceller of the seventh embodiment, the echo canceller and relevant functional portions act as the same as those of the second embodiment.

When a data call is applied to the echo canceller of the seventh embodiment, the operation controlling portion 29 recognizes the commencement of data call by "1" signal input from tone detecting portion 31, and end of data call by signalling information from channel associated signalling detecting portions 19, 20, and generates echo cancelling function disabling signal to the echo cancelling portion 22, and predetermined bit-pattern insertion inhibiting signal to pattern inserting portion 27 while the data call exists on the echo canceller.

Thus, if the normal voice signal is applied to the echo canceller of the seventh embodiment, the same automatic disabling capability of the echo cancelling function as that of the echo canceller of the second embodiment can be obtained when it is connected in tandem with other echo cancellers, and if the data call signal is applied to the echo canceller, the voice-band modem signals can be transferred transparently through the echo canceller without suffering any degradation in both directions.

Embodiment 8

Figure 8:
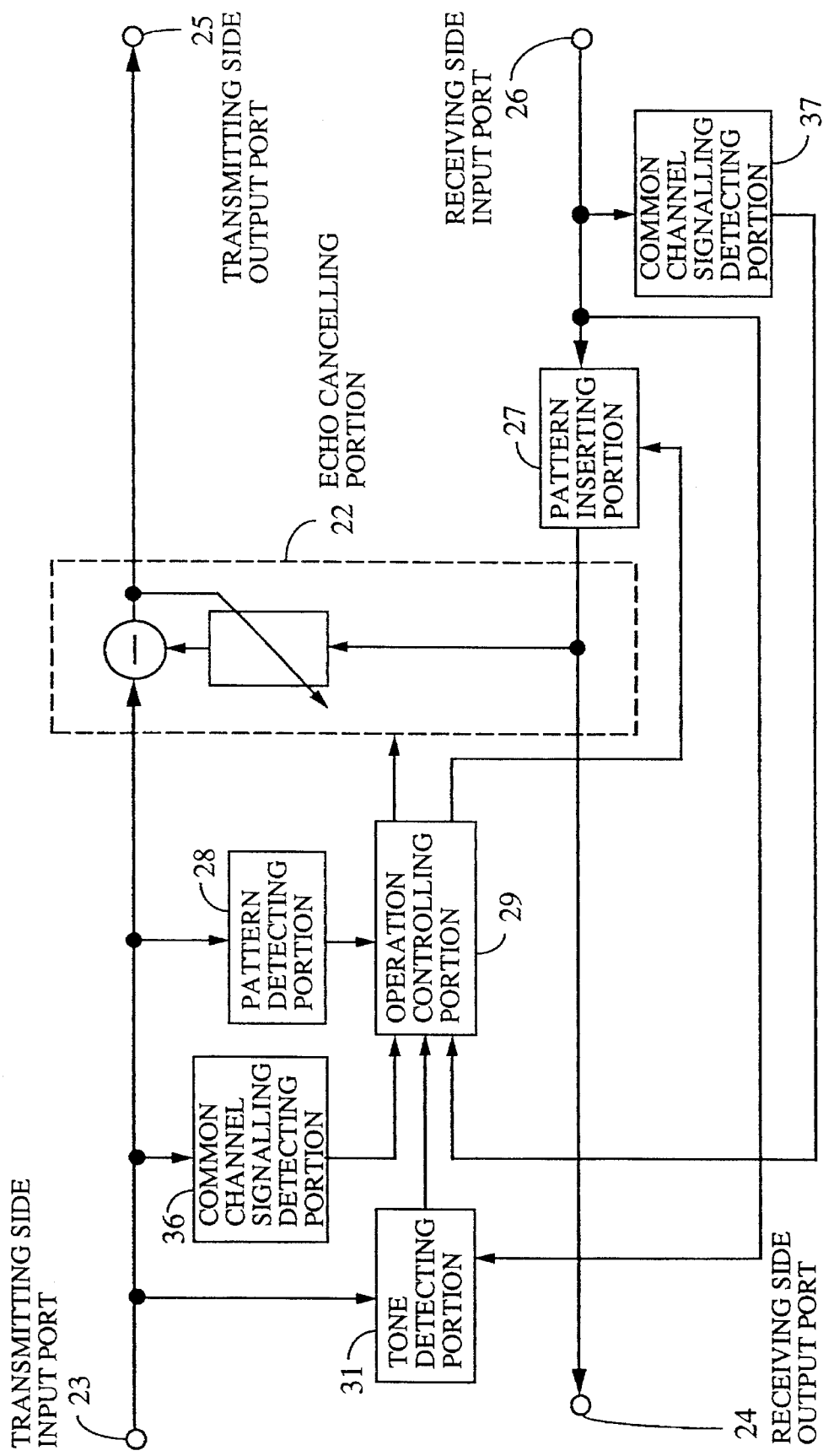
FIG. 8 shows a block diagram of an eighth embodiment of the present invention.

The eighth embodiment of the present invention is explained below. FIG. 8 shows the block diagram of the eighth embodiment of an echo canceller of the present invention.

In the eighth embodiment, a tone detecting portion 31 as explained before is combined with the blocks shown in FIG. 3.

In FIG. 8, the channel associated signalling detecting portions 19 and 20 of seventh embodiment in FIG. 7 are substituted with the common channel signalling detecting portions 36 and 37. The operation of the eighth embodiment is similar to that of the seventh embodiment only with the difference that the signalling information is derived from the common signalling channel instead of channel associated signalling channels.

Embodiment 9

Figure 9:
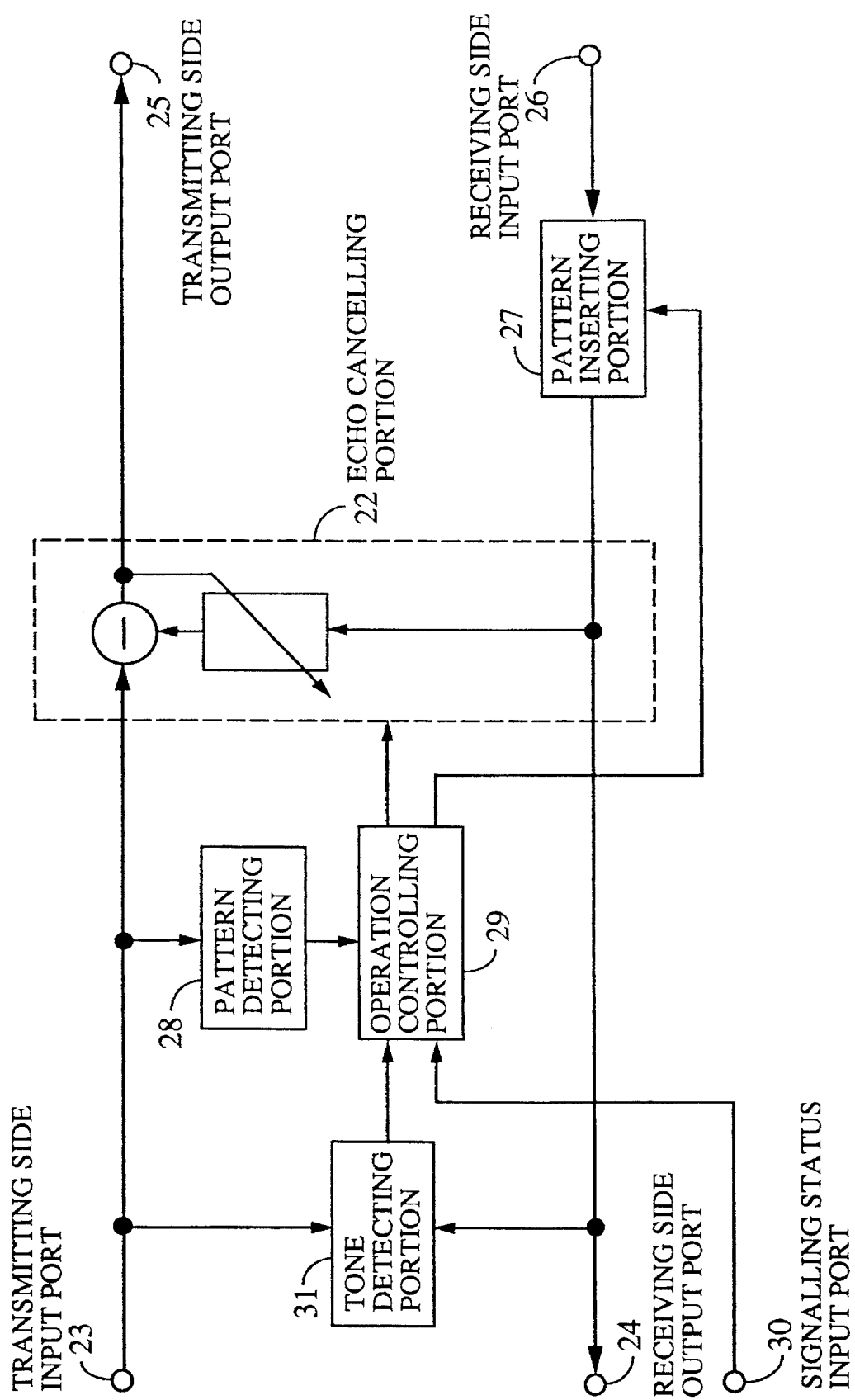
FIG. 9 shows a block diagram of a ninth embodiment of the present invention.

The ninth embodiment of the present invention is explained below. FIG. 9 shows the block diagram of the eighth embodiment of an echo canceller of the present invention.

In the ninth embodiment, a tone detecting portion 31 as explained before is combined with the blocks shown in FIG. 4.

In FIG. 9, the signalling status information of relevant channel is notified from the external signalling detecting apparatus via signalling status input port 30 as the case in fourth embodiment. The operation of the ninth embodiment is similar to those of the seventh and eighth embodiments only with the difference that the signalling information is derived not from the internal signalling detecting portion, 19, 20 or 36, 37, but from the signalling detecting apparatus outside the echo canceller.

As described above, in the ninth embodiment, the echo canceller does not need to equip the signalling detecting portions 19, 20 or 36, 37, the construction of the echo canceller can be simplified.

Embodiment 10

Figure 10:
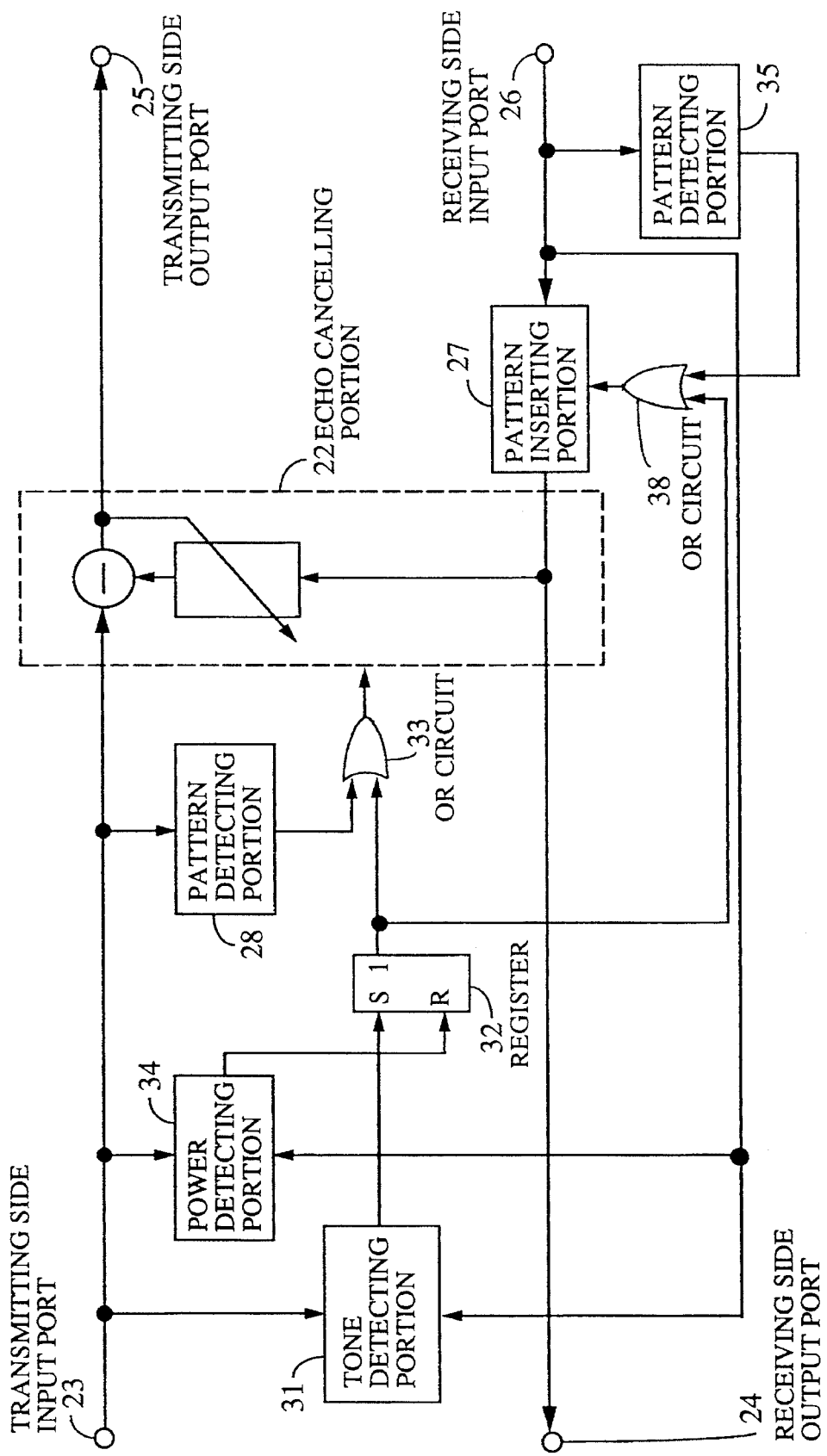
FIG. 10 shows a block diagram of a tenth embodiment of the present invention.

The tenth embodiment of the present invention is explained below. FIG. 10 shows the block diagram of the tenth embodiment of an echo canceller of the present invention.

In the tenth embodiment, a tone detecting portion 31, a register 32, an OR circuit 33 and a power detecting portion 34 as explained in sixth embodiment are combined with the blocks of the fifth embodiment in FIG. 5 together with another OR circuit 38.

In FIG. 10 the output of the register 32 is firstly OR-tied with the output of the pattern detecting portion 28 to control the echo cancelling portion 22, and secondly also OR-tied with the output of another pattern detecting portion 29 to control the pattern inserting portion 27.

The operation of the tenth embodiment is similar to those of the fifth embodiment and the sixth embodiment.

When a normal voice signal is applied to the echo canceller of the tenth embodiment, the echo cancelling portion and relevant functional portions act as the same as those of the fifth embodiment to realize the automatic disabling of echo cancelling function to avoid the interaction between the echo cancellers in tandem connection, and automatic disabling of pattern inserting function to avoid the multiple insertion of predetermined bit-pattern sequences into receiving side PCM bit stream.

When a data call is applied to the echo canceller of the tenth embodiment, the echo cancelling portion and relevant functional portions act as the same as those of the sixth embodiment also to realize the automatic disabling of echo cancelling function and pattern inserting function to ensure the transparent signal transfer for data modem signals.

Embodiment 11

Figure 11:
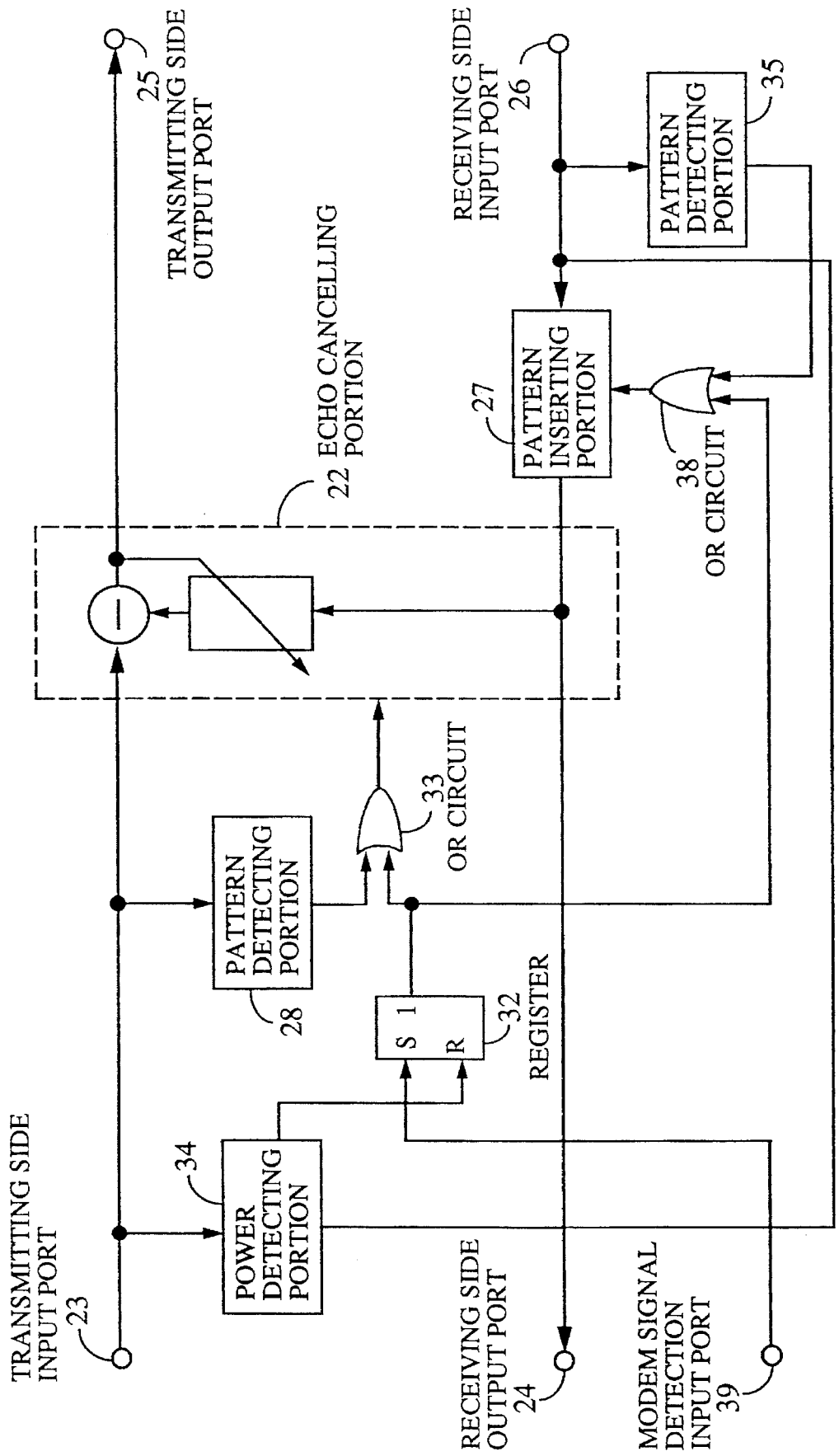
FIG. 11 shows a block diagram of an eleventh embodiment of the present invention.

The eleventh embodiment of the present invention is explained below. FIG. 11 shows the block diagram of the eleventh embodiment of an echo canceller of the present invention.

In the eleventh embodiment, a modem signal detection input port 39, instead of the tone detecting portion 31, is equipped with the blocks shown in FIG. 10.

In FIG. by, 11, "1" input signal from external modem answering tone detecting apparatus via modem signal detection input port 39 set the register 32 at the beginning of data call. The end of the call is detected by the power detecting portion 34 as explained in embodiment 6 to reset the register 32. Thus, the output of the register 32 becomes "1" wile a data call is applied to relevant echo canceller. The operation of the eleventh embodiment is similar to that of the tenth embodiment.

When a normal voice signal is applied to the echo canceller of the eleventh embodiment, the echo cancelling portion and relevant functional portions act as the same as those of the tenth embodiment to realize the automatic disabling of echo cancelling function to avoid the interaction between the echo cancellers in tandem connection, and automatic disabling of pattern inserting function to avoid the multiple insertion of predetermined bit-pattern sequences into receiving side PCM bit stream.

When a data call is applied to the echo canceller of the tenth embodiment, the echo canceller and relevant functional portions act as the same as those of the sixth embodiment also to realize the automatic disabling of echo cancelling function and pattern inserting function to ensure the transparent signal transfer for data modem signals.

As described above, in the eleventh embodiment, the echo canceller does not need to equip the tone detecting portion 31, the construction of the echo canceller can be simplified.

Embodiment 12

The twelfth embodiment of the present invention is explained below. The pattern inserting portion 27 of any of the preceding embodiments extracts LSBs of the PCM code-words for every several samples from the receiving side PCM input signal stream of echo canceller and inserts a predetermined bit-pattern sequence in place of the extracted bits. The pattern detecting portion 28 monitors LSBs of transmitting side input PCM code-words and generates the control signal to the echo cancelling portion 22 in order to disable the echo cancelling function, while the predetermined bit-pattern sequence is detected.

Although this process deteriorates the S/N ratio of the signal, it is able to decrease the influence on the speech communication quality by extending the bit extraction/insertion interval.

Embodiment 13

The thirteenth embodiment of the present invention is explained below. The pattern inserting portion 27 of any of the preceding embodiments 1–12 periodically extracts the second bits from the LSBs of the receiving side input PCM code-words and inserts a predetermined bit-pattern sequence in place of the extracted bits, when the echo canceller is used in the channel associated signalling system which utilizes the LSBs of the PCM code-words intermittently for channel associated signalling transmission.

It is well known that, for example, in the T1 network system (Specification established by Standardization Committee of American National Standards Institutes), the LSBs of the received PCM signal is robbed and used for a signalling transmission of relevant voice channel once in every six samples. Therefore, if the predetermined bit-pattern sequence is inserted into the LSBs of the receiving side PCM code-words at the pattern inserting portion 27 in place of the extracted bits, there is a possibility that above mentioned predetermined bit-pattern sequence is interfered by the bit-robbing for signalling transmission. Accordingly, there is some fear that the above mentioned predetermined bit-pattern sequence which is inserted at the pattern insertion portion 27 can not be detected at the pattern detecting portion 28 of the next stage.

To prevent the above disadvantage, the pattern inserting portion 27 of the embodiment 13 extracts the second bits from the LSBs of the PCM code-words and inserts a predetermined bit-pattern sequence instead of the LSBs of the receiving side PCM code-words. The pattern detecting portion 28 of the next stage monitors the second bits from the LSBs of transmitting side PCM code-words and generates the control signal to the echo cancelling portion 22 in order to disable the echo cancelling function of the echo canceller.

Embodiment 14

Figure 12:
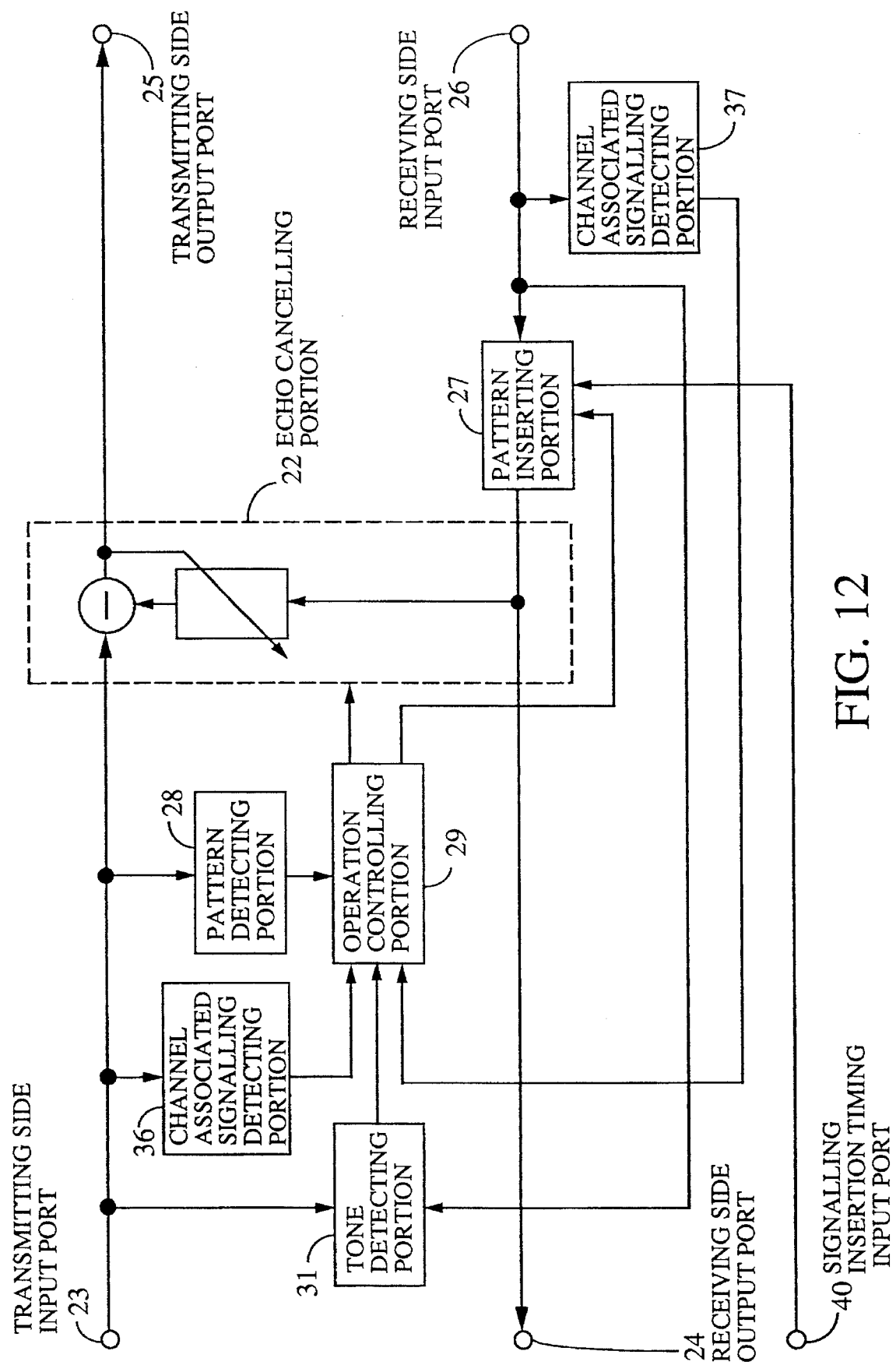
FIG. 12 shows a block diagram of a twelfth embodiment of the present invention.

The fourteenth embodiment of the present invention is explained below. FIG. 12 shows the block diagram of the fourteenth embodiment of an echo canceller of the present invention.

In the fourteenth embodiment, a signalling insertion timing input port 40 is combined with the blocks shown in FIG. 7 of the seventh embodiment.

In FIG. 12, the input signal to the signalling insertion timing input port 40 notifies the pattern inserting portion 27 of the bit-robbing signalling insertion timing of the receiving side T1 outward interface. With the knowledge of bit-robbing signalling insertion timing of six PCM-frame interval of receiving side T1 outward interface, the pattern inserting portion 27 selects another six-frame interval timing, which does not coincide with above mentioned bit-robbing signalling insertion timing of T1 interface, to insert the predetermined bit-pattern sequence into extracted LSBs. The operation of the rest of blocks in FIG. 12 is the same as those explained in embodiment 7. Accordingly, the predetermined bit-pattern sequence which is inserted in the least significant bit positions of every six frame interval is transferred to the next link without interfered by the bit-robbing signalling insertion at receiving side outward interface of T1 network system.

Embodiment 15

The fifteenth embodiment of the present invention is explained below. The pattern inserting portion 27 extracts LSBs of receiving side PCM code-words once in every six samples in the preceding embodiment 14 used in T1 network system as described above.

To eliminate the synchronizing function of pattern insertion cycle to signalling insertion cycle, the pattern inserting portion 27 of the fifteenth embodiment extracts LSBs of receiving side PCM code-words with the insertion cycle not synchronized to that of signalling insertion cycle, for example, extracting LSBs of the receiving side PCM code-word once in every seven samples to insert the predetermined bit-pattern sequence in place of the extracted bit. The above mentioned number, "seven", of insertion cycle period has a prime number relation with that of the bit-robbing cycle period, "six" of T1 interface, which is used in the channel associated signalling system.

The pattern detecting portion 28 of the echo canceller of next stage monitors LSBs of transmitting side input PCM code-word and generates a control signal to the echo cancelling portion 22 in order to disable the echo cancelling function.

Suppose the PCM code words of consecutive 42 frames on a specific voice channel, six bits of the predetermined bit-sequence are inserted therein. On the other hand, seven signalling bits of bit-robbing T1 signalling system are inserted within the same 42-frame period both in the LSB position. Therefore, only one bit out of six consecutive bits of the predetermined bit-pattern is overridden by the signalling bits, which may corrupt the predetermined bit-pattern sequence.

FIG. 13 shows an example of telephone communications network in which the three points are connected via digital multiplexers and exchanges. The FIG. 14 shows an example of tandem connection of transmission links. As described above, in FIG. 14, the predetermined bit-pattern sequences inserted at the pattern inserting portion of the echo canceller 13 has the chance to be overridden by the bit-robbing signalling insertion for the first time at the T1 output interface of the digital multiplexer 8 to exchange 5, and for the second time also at the T1 output interface of the exchange 5 to digital multiplexer 8 before monitored and detected by the pattern detecting portion 28 of the echo canceller 14 in the direction from telephone terminal 1 to terminal 2.

Therefore, it is understood that up to two bits out of six bits of the predetermined bit-pattern sequence have a possibility to be corrupted by the bit-robbing signalling bits used in the T1 network system. Accordingly, a predetermined bit-pattern sequence can be detected correctly by permitting the corruption of bit-pattern sequence up to two bits out of six bits in the pattern matching detection process of pattern detecting portion 28 of echo canceller.

In course of periodic extraction/insertion of predetermined bit-pattern sequence into the second bits from the LSBs of PCM code-words at the pattern inserting portion 27 of the embodiment 14, the deterioration of S/N ratio becomes larger compared with that of embodiment 10 where the extraction/insertion are performed with the LSBs of receiving side PCM code-words. Therefore, it is appropriate to use LSBs to insert the bit-pattern sequence as shown in embodiment 14 rather than to insert the bit-pattern sequence into the second bits from the LSBs as shown in the embodiment 13.

The embodiment 15 has an advantage rather than the embodiment 14 on the point that the synchronization control between the bit-robbing signalling insertion process and predetermined bit-pattern insertion process which makes the construction of echo canceller simpler.

Those skilled in the art will recognize that many modifications to the foregoing description can be made without departing from the spirit of the invention.

The foregoing description is intended to be exemplary and in no way limiting. The scope of the invention is defined in the appended claims and equivalents thereto.

What is claimed is:

1. An echo canceller which cancels echo generated at 2-wire/4-wire conversion portion by impedance mismatching comprising:
   (a) an echo cancelling means for cancelling echo signal;
   (b) a pattern inserting means for extracting a predetermined portion of a receiving side pulse code modulation (PCM) input signal and inserting a predetermined bit-pattern sequence into a receiving side PCM output signal in place of the extracted portion; and
   (c) a pattern detecting means for detecting a predetermined bit pattern by monitoring a transmitting side input PCM signal, and disabling the echo cancelling function of the echo cancelling means when the predetermined bit-pattern is detected.

2. An echo canceller which cancels echo generated at 2-wire/4-wire conversion portion by impedance mismatching comprising:
   (a) an echo cancelling means for cancelling echo signal;
   (b) a first channel associated signal detecting means for determining whether a voice channel at the receiving side is in an idle state;
   (c) a second channel associated signal detecting means for determining whether a voice channel at the transmitting side is in an idle state;
   (d) a pattern detecting means for detecting a predetermined bit-pattern in a transmitting side input pulse code modulation (PCM) signal;
   (e) a pattern inserting means for inserting a predetermined bit-pattern sequence into a receiving side PCM signal; and
   (f) an operation controlling means for disabling echo cancelling function of the echo canceling means after detection of the predetermined bit-pattern in the transmitting side input PCM signal until the voice channel is in an idle state as detected by both the first and second channel associated signal detecting means, and for enabling the pattern inserting means for a predetermined duration when the voice channel status changes from the idle state to a busy state as detected by both the first and second channel associated signal detecting means.

3. An echo canceller which cancels echo generated at 2-wire/4-wire conversion portion by impedance mismatching comprising:
   (a) an echo cancelling means for cancelling echo signal;
   (b) a first common channel signal detecting means for determining whether a voice channel at the receiving side is in an idle state;
   (c) a second common channel signal detecting means for determining whether a voice channel at the transmitting side is in an idle state;
   (d) a pattern detecting means for detecting a predetermined bit-pattern in a transmitting side input pulse code modulation (PCM) signal;
   (e) a pattern inserting means for inserting a predetermined bit-pattern sequence into a receiving side PCM signal; and
   (f) an operation controlling means for disabling echo cancelling function of the echo canceling means after detection of the predetermined bit-pattern in the transmitting side input PCM signal until the voice channel is in an idle state as detected by both the first and second common channel signal detecting means, and for enabling the pattern inserting means for a predetermined duration when the voice channel status changes from the idle state to a busy state as detected by both the first and second common channel signal detecting means.

4. An echo canceller which cancels echo generated at 2-wire/4-wire conversion portion by impedance mismatching, where a channel associated signaling signal or a common channel signaling signal is not included in receiving side or transmitting side input signal bit streams comprising:
   (a) an echo cancelling means for cancelling echo signal;

(b) a signaling status input to obtain a channel status indicating whether a relevant voice channel is in an idle state or in a busy state.

(c) a pattern inserting means for inserting a predetermined bit-pattern into a receiving voice channel pulse code modulation (PCM) signal when the signaling status input indicates that the relevant voice channel status changed from an idle state to a busy state;

(d) a pattern detecting means for detecting a predetermined bit pattern by monitoring a transmitting side input PCM signal; and (e) an operation controlling means for disabling echo cancelling function of the echo cancelling means after detection of the predetermined bit-pattern in the transmitting side input PCM signal until the voice channel status input changes from a busy state to an idle state, and for enabling the predetermined bit-pattern inserting means for a predetermined duration after the voice channel status changes from an idle state to a busy state.

5. An echo canceller which cancels echo generated at 2-wire/4-wire conversion portion by impedance mismatching comprising:

(a) an echo cancelling means for cancelling echo signal;

(b) a first pattern detecting means for detecting a predetermined bit pattern in a transmitting side input pulse code modulation (PCM) signal, and disabling the echo cancelling function of the echo cancelling means when the predetermined bit-pattern is detected;

(c) a second pattern detecting means for detecting a predetermined bit pattern by monitoring receiving side input PCM signal bit stream; and (d) a pattern inserting means for inserting a predetermined a bit pattern into a receiving side voice channel PCM signal when the second pattern detecting means does not detect the predetermined bit-pattern.

6. An echo canceller which cancels echo generated at 2-wire/ 4-wire conversion portion by impedance mismatching comprising:

(a) an echo cancelling means for cancelling echo signal, which is disabled when a predetermined bit-pattern is detected in a transmitting side input pulse code modulation (PCM) signal, or while a data call is applied to a voice channel;

(b) a pattern inserting means for inserting a predetermined bit pattern in a receiving side PCM signal while the data call is not applied to the voice channel;

(c) a pattern detecting means for detecting the predetermined bit-pattern in the transmitting side input PCM signal;

(d) a tone detecting means for detecting a modem answering tone by monitoring the transmitting side PCM signal and a receiving side input PCM signal;

(e) a power detecting means for detecting an end of a data call by monitoring the absence of signal power for more than predetermined period in both the transmitting and receiving side input PCM signals; and (f) a register for applying the data call to the voice channel after the modem answering tone signal is detected until the power detecting means detects the end of the data call.

7. An echo canceller which cancels echo generated at 2-wire/4-wire conversion portion by impedance mismatching, where a voice channel is not coded by low bit rate coding comprising:

(a) an echo cancelling means for cancelling echo signal;

(b) a first channel associated signal detecting means for determining whether the voice channel at the receiving side is in an idle state;

(c) a second channel associated signal detecting means for determining whether the voice channel at the transmitting side is in an idle state;

(d) a pattern inserting means for inserting a predetermined bit-pattern in the receiving side pulse code modulation (PCM) signal;

(e) a pattern detecting means for detecting a predetermined bit-pattern in a transmitting side input PCM signal;

(f) a tone detecting means for detecting a modem answering tone by monitoring both the transmitting side input PCM signal and a receiving side input PCM signals; and (g) an operation controlling means for disabling an echo cancelling function of the echo cancelling means after detection of the predetermined bit-pattern in the transmitting side input PCM signal at the pattern detecting means or after detection of the modem answering tone, until the voice channel status changes from a busy state to an idle state as detected by both the first and the second channel associated signal detecting means, and for enabling the pattern inserting means for a predetermined duration when the voice channel status changes from an idle state to a busy state as detected by both the first and second channel associated signal detecting means, and disabling the pattern inserting means when the modem answering tone is detected.

8. An echo canceller which cancels echo generated at 2-wire/4-wire conversion portion by impedance mismatching comprising:

(a) an echo cancelling means for cancelling echo signal;

(b) a first common channel signal detecting means for determining whether a voice channel at the receiving side is in an idle state;

(c) a second common channel signal detecting means for determining whether the voice channel at the transmitting side is in an idle state;

(d) a pattern inserting means for inserting a predetermined bit-pattern in a receiving side pulse code modulation (PCM) signal;

(e) a pattern detecting means for detecting a predetermined bit-pattern in a transmitting side input PCM signal;

(f) a tone detecting means for detecting a modem answering tone by monitoring both the transmitting side input PCM signal and a receiving side input PCM Signal; and (g) an operation controlling means for disabling an echo cancelling function of the echo cancelling means after detection of the predetermined bit-pattern in the transmitting side input PCM signal at the pattern detecting means or after detection of the modem answering tone, until the voice channel status changes from a busy state to an idle state as detected by both the first and the second channel associated signal detecting means, and for enabling the pattern inserting means for a predetermined duration when the voice channel status changes from an idle state to a busy state as detected by both the first and second channel associated signal detecting means, and disabling the pattern inserting means when the modem answering tone is detected.

9. An echo canceller which cancels echo generated at 2-wire/4-wire conversion portion by impedance mismatching comprising:

(a) an echo canceller circuit for cancelling echo signal;

(b) a signaling status input to obtain a channel status indicating whether a relevant voice channel is in an idle state or in a busy state;

(c) a pattern inserting means for inserting a predetermined bit-pattern into a receiving voice channel pulse code modulation (PCM) signal for a predetermined duration when the signaling status input indicates that the relevant voice channel status changed from an idle state to a busy state;

(d) a pattern detecting means for detecting a predetermined bit pattern by monitoring a transmitting side input PCM signal;

(e) a tone detecting means for detecting a modem answering tone by monitoring both transmitting side and receiving side input PCM signals; and (f) an operation controlling means for disabling echo cancelling function of the echo cancelling means after detection of the predetermined bit-pattern in the transmitting side input PCM signal or after detection of the modem answering tone until the voice channel status input changes from a busy state to an idle state, for enabling the predetermined bit-pattern inserting means for a predetermined duration after the voice channel status changes from an idle state to a busy state, and for disabling the pattern inserting means when the modem answering tone is detected.

10. An echo canceller which cancels echo generated at 2-wire/ 4-wire conversion portion by impedance mismatching comprising:

(a) an echo cancelling means for cancelling echo signal, which is disabled when a predetermined bit-pattern is detected in a transmitting side input pulse code modulation (PCM) signal, or while a data call is applied to a voice channel;

(b) a first pattern detecting means for detecting the predetermined bit-pattern in the transmitting side input PCM signal bit stream, and disabling the echo canceling function of the echo canceling means while the predetermined bit-pattern is detected;

(c) a second pattern detecting means for detecting a predetermined bit-pattern in the receiving side input PCM signal;

(d) a pattern inserting means for inserting a predetermined bit pattern in a receiving side PCM signal while the predetermined bit-pattern is not detected at the receiving side input PCM signal or while the data call is applied to the voice channel;

(e) a tone detecting means for detecting a modem answering tone by monitoring the transmitting side input PCM signal and a receiving side input PCM signal;

(f) a power detecting means for detecting an end of a data call by monitoring the absence of signal power for more than predetermined period in both the transmitting and receiving side input PCM signals; and (g) a register for applying the data call to the voice channel after the modem answering tone signal is detected until the power detecting means detects the end of the data call.

11. An echo canceller which cancels echo generated at 2-wire/4-wire conversion portion by impedance mismatching comprising:

(a) an echo cancelling means for cancelling echo signal, which is disabled when a predetermined bit-pattern is detected in a transmitting side input pulse code modulation (PCM) signal, or while a data call is applied to a voice channel;

(b) a first pattern detecting means for detecting the predetermined bit-pattern in the transmitting side input PCM signal;

(c) a second pattern detecting means for detecting a predetermined bit pattern in the receiving side input PCM signal;

(d) a pattern inserting means for inserting a predetermined bit pattern in a receiving side PCM signal while the predetermined bit-pattern is not detected at the receiving side input PCM signal or while the data call is applied to the voice channel;

(e) a modem signal detection input which receives detection information of a modem answering tone from an external tone detecting apparatus;

(f) a power detecting means for detecting an end of a data call by monitoring the absence of signal power for more than predetermined period in both the transmitting and receiving side input PCM signals; and (g) a register for applying the data call for a duration after receipt of detection information by the modem signal detection input.

12. An echo canceller which cancels echo generated at 2-wire/4-wire conversion portion by impedance mismatching comprising:

(a) an echo cancelling means for cancelling echo signal;

(b) a first common channel signal detecting means for determining whether the voice channel at the receiving side is in an idle state;

(c) a second common channel signal detecting means for determining whether the voice channel at the transmitting side is in an idle state;

(d) a pattern inserting means for inserting a predetermined bit-pattern in the receiving side pulse code modulations (PCM) signal;

(e) a pattern detecting means for detecting a predetermined bit-pattern in a transmitting side input PCM signal;

(f) a tone detecting means for detecting a modem answering tone by monitoring both the transmitting side input PCM signal and a receiving side input PCM signals; and (g) an operation controlling means for disabling an echo cancelling function of the echo cancelling means after detection of the predetermined bit-pattern in the transmitting side input PCM signal at the pattern detecting means or after detection of the modem answering tone until the voice channel status changes from a busy state to an idle state as detected by both the first and the second common channel signal detecting means, for enabling the pattern inserting means for a predetermined duration when the voice channel status changes from an idle state to busy state as detected by both the first and second common channel signal detecting means, and for disabling the pattern inserting means when the modem answering tone is detected.

13. An echo canceller according to any one of claims 1–12, wherein said pattern inserting means is arranged between exchanges of a channel associated signaling system and periodically extracts second bits from least significant bits of receiving side PCM signal code-words and inserts the predetermined bit-pattern into the receiving side PCM signal code-words in place of the extracted second bits.

14. An echo canceller according to any one of claims 1–12, wherein said pattern inserting means is arranged between exchanges of a channel associated signaling system and extracts least significant bits of receiving side PCM signal code-words with a period which has a prime number relation to a period of a PCM robbed-bit signaling system and inserts the predetermined bit-pattern into the receiving side PCM signal code-words in place of the extracted bits.

15. A method for controlling echo cancellation in an echo canceller which cancels echo generated at 2-wire/4-wire conversion portion by impedance mismatching, said method comprising the steps of:

(1) inserting a predetermined bit-pattern sequence in a receiving side pulse code modulation (PCM) signal; and (2) disabling said echo cancellation when the predetermined bit-pattern is detected in a transmitting side input PCM signal.

16. The method of claim 15, further comprising the steps of:

(3) detecting whether a voice channel is in an idle state; wherein said pattern is inserted upon detecting a change from an idle state to a busy state; and wherein said echo cancellation is disabled until a change from a busy state to an idle state is detected.

17. The method of claim 15, wherein said insertion step includes periodically extracting least significant bits from the receiving side input PCM signal code-words and inserting the predetermined bit-pattern sequence.

18. The method of claim 15, wherein said inserting step includes periodically extracting second bits from least significant bits of the receiving side input PCM signal and inserting the predetermined bit-pattern sequence.

19. The method of claim 15, wherein said inserting step includes extracting least significant bits of the receiving side input PCM signal code-words with a period which has a prime number relation with a period of a PCM robbed bit signaling system.

20. The method of claim 15, further comprising the steps of:

(3) determining when a disable tone is present;

(4) stopping said inserting step when said disable tone is present; and wherein said echo cancellation is disabled when said disable tone is present.

21. The method of claim 20, wherein said disable tone is a modem answering tone.

22. The method of claim 20, wherein said disable tone is a 2100 Hz sinusoidal signal.

23. The method of claim 20, wherein said disable tone is a 2100 Hz sinusoidal signal with periodical phase reversal.

24. The method of claim 15, further comprising the steps of:

(3) detecting the predetermined pattern by monitoring the receiving side input PCM signal;

(4) stopping said inserting step in response to said predetermined pattern being detected in the receiving side input PCM signal.

25. The method of claim 24, further comprising the steps of:

(5) determining when a disable tone is present;

(6) disabling said inserting step when said disable tone is present; and wherein said echo cancellation is disabled when said disable tone is present.

26. An echo canceller which cancels echo generated at 2-wire/4-wire conversion portion by impedance mismatching comprising:

(1) an echo cancelling means for cancelling echo signal;

(2) a predetermined bit-pattern sequence insertion means for inserting a pattern in a receiving side pulse code modulation (PCM) signal; and (3) operation control means for disabling said echo cancelling means when the pattern is detected in transmitting side input PCM signal.

27. The echo canceller of claim 26, further comprising:

(4) pattern detection means for detecting said predetermined bit-pattern in transmitting side input PCM signal.

28. The echo canceller of claim 26, wherein said pattern insertion means periodically extracts least significant bits from receiving side PCM signal code-words and inserts the predetermined bit-pattern sequence into the receiving side PCM signal code-words in place of the extracted bits.

29. The echo canceller of claim 26, wherein said pattern insertion means is arranged between exchanges of a channel associated signaling system and periodically extracts second bits from least significant bits of receiving side PCM signal code-words and inserts the predetermined bit-pattern sequence into the receiving side PCM signal code-words in place of the extracted second bits.

30. The echo canceller of claim 26 wherein said pattern insertion means is arranged between exchanges of a channel associated signaling system and extracts least significant bits of receiving side PCM signal code-words with a period which has a prime number relation with a period of a bit robbing PCM signaling system and inserts the predetermined bit-pattern sequence into the receiving side PCM signal code-words in place of the extracted bits.

31. The echo canceller of claim 26, further comprising pattern detecting means for detecting said predetermined pattern in a transmitting side input PCM signal.

32. The echo canceller of claim 26, further comprising:

(4) signaling detection means for determining whether a voice channel is in idle state; and (5) pattern control means for controlling said pattern insertion means so that said pattern is inserted when said signaling detection means detects a change from busy state to idle state;

wherein said operation control means disables said echo cancelling means until said signaling detection means detects the status change from busy state to idle state.

33. The echo canceller of claim 32, wherein said signaling detection means includes channel associated signaling detection means.

34. The echo canceller of claim 32, wherein said signaling detecting means includes common signaling detection means.

35. The echo canceller of claim 32, wherein said signaling detecting means includes an input port indicating the signaling status of the voice channel.

36. The echo canceller of claim 35, further comprising:

(6) tone detecting means for determining when a disable tone is present;

(7) pattern control means for disabling said pattern insertion means when said disable tone is present; and wherein said operation control means disables said echo cancellation circuit when said disable tone is present.

37. The echo canceller of claim 36, wherein said tone detecting means includes an input port for indicating modem signal detection.

38. The echo canceller of claim 36, wherein said tone detecting means includes means for detecting a disable tone by monitoring said transmitting side and receiving side PCM signals.

39. The echo canceller of claim 38, wherein said disable tone is a modem answering tone.

40. The echo canceller of claim 26, further comprising:

(4) second pattern detecting means for detecting said pattern by monitoring a receiving side input PCM signal; and (5) pattern disabling means for disabling said pattern insertion means in response to pattern detection by said second pattern detecting means.

41. The echo canceller of claim 40, further comprising:

(6) tone detecting means for determining when a disable tone is present;

(7) pattern control means for disabling said pattern insertion means when said disable tone is present;

wherein said operation control means disables said echo cancellation of the echo cancelling means when said disable tone is present.

42. An echo canceller which cancels echo generated, comprising:

(a) an echo cancelling means for cancelling echo signal;

(b) a pattern inserting means for inserting a predetermined bit-pattern sequence into a receiving side pulse code modulation (PCM) output signal; and (c) a pattern detecting means for detecting a predetermined bit-pattern by monitoring a transmitting side input PCM signal, and disabling the echo cancelling function of the echo cancelling means when the predetermined bit-pattern is detected.

43. An echo canceller which cancels echo generated, comprising:

(a) an echo cancelling means for cancelling echo signal;

(b) a pattern inserting means for extracting a portion of a receiving side pulse code modulation (PCM) input signal and inserting a predetermined bit-pattern sequence into a receiving side PCM output signal in place of the extracted portion; and (c) a pattern detecting means for detecting a predetermined bit pattern by monitoring a transmitting side input PCM signal, and disabling the echo cancelling function of the echo cancelling means when the predetermined bit-pattern is detected.

44. A method for controlling echo cancellation in an echo canceller which cancels echo generated, said method comprising the steps of:

(1) inserting a predetermined bit-pattern sequence in a receiving side pulse code modulation (PCM) signal; and (2) disabling said echo cancellation when the predetermined bit-pattern is detected in a transmitting side input PCM signal.

* * * * *